United States Patent [19]
Bell et al.

[11] Patent Number: 6,014,134
[45] Date of Patent: *Jan. 11, 2000

[54] NETWORK-BASED INTELLIGENT TUTORING SYSTEM

[75] Inventors: Brigham R. Bell, Boulder; William D. Hurley; Srdjan N. Kovacevic, both of Louisville, all of Colo.; Michelle Neves, Pleasantville, N.Y.; Alan S. Wolff, Boulder, Colo.; Charles P. Bloom, Weston, Conn.

[73] Assignees: U S West, Inc., Denver; MediaOne Group, Inc., Englewood, both of Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/702,335

[22] Filed: Aug. 23, 1996

[51] Int. Cl.$^7$ .............................. G06F 13/00; G09B 5/12
[52] U.S. Cl. ...................... 345/329; 345/336; 434/118; 709/203; 709/218
[58] Field of Search .................................. 345/329, 333, 345/334, 335, 337, 336; 395/200.32, 200.34, 200.35, 200.48, 200.33; 434/118, 219, 227, 231

[56] References Cited

U.S. PATENT DOCUMENTS

| | | | |
|---|---|---|---|
| 5,421,730 | 6/1995 | Lasker, III et al. | 434/118 |
| 5,590,331 | 12/1996 | Lewis et al. | 395/708 |
| 5,597,312 | 1/1997 | Bloom et al. | 434/362 |
| 5,608,426 | 3/1997 | Hester | 345/153 |
| 5,618,182 | 4/1997 | Thomas | 434/118 X |

(List continued on next page.)

OTHER PUBLICATIONS

Marc A. Hamilton, Java and the shift to Net Centric Computing, pp. 31–39, Aug. 1996.

The Java Language Environment—white paper, James Goshing, Henry McGilton, Sun Microsystem, Inc. pp. 9–12, 32–33, 52–53, 58, May 1995.

The Java language Specification, Release 1.0 Alpha 3, Sun Microsystems, Inc, May 1995.

Java Virtual Machine for Virtually Any Platform, Simon Waddington, Stephen Li, Embedded Systems Programming—Jun. 1996.

Hurley, David W., "A Process Model for Interactive Systems," Feb. 9, 1993, pp. 251–271.

(List continued on next page.)

*Primary Examiner*—Raymond J. Bayerl
*Assistant Examiner*—Chadwick A. Jackson
*Attorney, Agent, or Firm*—Holme, Roberts & Owen

[57] ABSTRACT

A technique for providing a networked, distributed tutorial application having a direct manipulation graphical user interface displayable on an Internet client node is disclosed. The application has a first portion on an Internet server node and a second portion on the Internet client node, the first portion performing application specific subject matter processing and the second portion being substantially application independent in that this second portion is applicable in a wide variety of tutoring applications for generating and maintaining an appropriate user interface during user interactions. The second portion includes an Internet browser (e.g., a hypertext mark-up language browser) that is utilized for communicating with the server node to perform application subject matter specific processing. A user being tutored may create, delete or modify graphical objects whose data structure definitions are provided by the server node, each such object having, for example, a behavior or data structure representing the semantics of a tutorial subject matter entity. Such user interactions are accumulated and utilized on the client node to maintain, independently of any communication with the server node, an interactive user interface semantically consistent with both the tutorial application and the user's interactions.

25 Claims, 18 Drawing Sheets

U.S. PATENT DOCUMENTS

| | | | |
|---|---|---|---|
| 5,752,836 | 5/1998 | Clark et al. | 434/118 X |
| 5,788,508 | 8/1998 | Lee et al. | 434/118 X |
| 5,823,781 | 10/1998 | Hitchcock et al. | 434/118 |

OTHER PUBLICATIONS

Balzer, Robert, "A 15 Year Perspective on Automatic Programming," 1985, pp. 1257–1268.

Kovacevic, Srdjan, "Tactics for User Interface Design: Coupling the Compositional and Transformational Approach," Oct. 5, 1993, pp. 1–10.

Foley, James, et al., "the User Interface Design Environment," date unknown, pp. 263–286.

Kovacevic, S., "A Compositional Model of Human–Computer Interaction," 1992b.

```
(:application-header Static Associations            702                726
 :ui (:po ((DialogBox :name "Identify Static Associations" :template Graphical :member t)))
708 :init (:objects ((noun-phrase (name consortium) ... (name banks) ...))    724
712 :data (((:data-type cardinality :enum (0 Many))))
   :objects (((:object noun-phase :attributes ((:attr name :type :string)) :ui (:po (nil)))
                                                                              722
              :object actor :ui (:po (Actor))
              :attributes ((:attr name) (:attr cardinality :type cardinality)
                           (:attr external-properties :set-min 0  :set-max nil
                                  :type (:object-instance exernal-property)))
         728
              :object object-class ....)
              :attr noun-phase :type (:object-instance noun-phase))))
              :object external-property :attributes ((:attr name)
                                          (:attr origin :type (:object-instance (actor object-class)))
                                          (:attr target :type (:object-instance (actor object-class)))
716
              :ui (:po ((External-Property :include (origin target)
                         :map-properties ((origin origin-obj) (target target-obj)))))))))
```

FIG. 7A

```
:actions (((:action CoachAssistance :mssg Mssg2Coach :parameters 0 :xform ((:conform :implicit)
             :ui (:itec (:select ((MenuItem :name "Coach Assistance" :submenu Coach)))))
             (:action CoachHint ...)
           (:action identify-actor :mssg sar-create-actor :xform (:reusable (:visible always))
             :parameters ((:par noun-phrase :type (:object-instance noun-phrase)
                           :ui (:itec ((ChoiceSelection :filter (:attributes name)
                                         :prefix t :name "Noun Term"))))
                          (:par cardinality :type cardinality))
             :preconditions ((exist noun-phrase)))
           (:action identify-object-class ...)
           (:action identify-external-property :mssg sar-create-external-prep
             :parameters ((:par name :type :string)
                          (:par origin "type (:object-instance (actor object-class))
                            :ui (:itec ((MouseButton))))
                          (:par target :type (:object-instance (actor object-class))
                            :ui (:itec ((MouseButton :action Release)))))
             :preconditions ((exist (object-class actor) 2))
             :postconditions 0
             :xform (:reusable (:visible always)))
```

| Action | Item | Rating | Type | Time |
|---|---|---|---|---|
| Added | For Syn_Set_7, isRelevant TRUE | Correct | No Help | 01/16/96 12:13:42 |
| Added | For Syn_Set_17, isRelevant TRUE | Correct | No Help | 01/18/96 12:43:11 |
| Added | For Syn_Set_27, isRelevant FALSE | Incorrect | No Help | 01/18/96 12:43:11 |
| Replaced | For Syn_Set_27, isRelevant FALSE replaced with TRUE | Correct | No Help | 01/18/96 12:43:51 |
| Added | For Syn_Set_37, isRelevant TRUE | Correct | Demonstration | 01/18/96 12:46:31 |
| Added | For Syn_Set_57, isRelevant TRUE | Incorrect | No Help | 01/18/96 12:48:04 |
| Replaced | For Syn_Set_57, isRelevant TRUE replaced with FALSE | Correct | No Help | 01/18/96 12:48:33 |
| Added | For Syn_Set_67, isRelevant FALSE | Correct | No Help | 01/18/96 12:48:33 |

FIG. 15

NETWORK-BASED INTELLIGENT TUTORING SYSTEM

FIELD OF THE INVENTION

The present invention relates to a method and system for providing an Internet distributed application wherein a direct manipulation graphical user interface is provided on an Internet client node.

BACKGROUND OF THE INVENTION

It is becoming increasingly important for organizations to keep their personnel highly trained in state-of-the-art technologies. However, it is also expensive to provide such training. In particular, there are expenses for trainers and materials as well as travel expenses for either (or both) trainers and trainees. To alleviate some of these expenses, automated learning or tutorial systems have been developed. However, such systems may provide minimal user (i.e., trainee) interaction or, if highly interactive, may require substantial hardware and/or software expenditures for "training centers." Further, there may still remain substantial travel expenditures for organization personnel utilizing such a training center.

The above-described scenario is particularly true for training in software development technologies. In particular, some of the most effective software development concepts and techniques, such as used in object-oriented software development, have been slow to be fully utilized due to a significant overhead in (re)training software developers in the use of object-oriented technologies.

Accordingly, it would be advantageous to have a highly interactive tutorial system for teaching or tutoring users regarding object-oriented software design and development that both reduces the need for trainers and is readily accessible by users via mass produced, low cost components, wherein users may be tutored from their normal place of work.

SUMMARY OF THE INVENTION

The present invention is an intelligent tutoring system for use on wide area networks such as the World Wide Web (WWW) portion of the Internet. That is, the present invention is a network based tutoring system based on an Internet protocol such as the Hypertext Transfer Protocol (HTTP) wherein:

(1.1) A user model is constructed and maintained of each user being tutored by the present invention wherein this model allows the present invention to interact with a user in a manner whereby the user perceives that the tutoring system responds to the semantics or meaning of the user's requests;

(1.2) The user model resides on, for example, a World Wide Web (WWW) server remote from the user who is interactive with a WWW client node browser;

(1.3) The bandwidth of communication between the user and this WWW server is reduced since the user interface for the user is generated on the user's client node in response to higher level user interaction specifications communicated from the WWW server, wherein this specification provides substantially only the semantics of a user interface and guidelines or hints as to the actual user interface to be presented to the user.

More particularly, the present invention is an intelligent tutoring system for assisting users with learning object-oriented software design principles. Known as SLOOP (the System for Learning Object-Oriented Paradigms), the present invention provides training in software development requirements modeling as well as analysis and design modeling using object-oriented concepts and techniques.

It is an aspect of SLOOP to provide an intelligent coaching environment for allowing a user to practice object-oriented modeling skills via the WWW. In particular, users may undertake a software design project provided by the present invention. Such a project includes a series of activities, or steps, to develop a requirements model (implementation independent) of a proposed software system for the project. Such projects commence with a problem definition that consists of one or more high-level problem description diagrams and additionally a number of case scenarios describing structural and dynamic information and exceptions related to the problem. Further, for each project activity, SLOOP evaluates user responses and provides feedback and different kinds of assistance or coaching such as explaining an activity, demonstrating an activity, and presenting a solution to an activity.

It is a further aspect of the present invention to provide a direct manipulation graphical user interface using an Hypertext Markup Language (HTML) browser. In particular, the present invention provides a client node user with the ability to interact with a tutorial application relating to a particular subject matter (e.g., banking transactions) so that the user can create, delete or modify graphical objects whose data structure definitions were provided by the server node, each such object having, for example, a behavior or data structure representing the semantics of a tutorial subject matter entity (e.g., for a banking tutorial application such an entity could be a bank, an automated teller machine or a customer bank account, etc.), wherein such user changes, independently of any communication with the SLOOP server node, are accumulated and utilized on the client node to maintain an interactive user interface semantically consistent both with the tutorial subject matter application and with the user's interactions. This is accomplished without activating any client resident process having programmatic instructions embodying the semantics of the tutorial subject matter. That is, the maintenance and control of a subject matter specific user interface, based on a direct manipulation paradigm, is accomplished by a combination of local control with periodic activation of the HTML browser to communicate with the server node for performing processing that is application specific. Accordingly, for the application processing on the client node, it is unnecessary to have a subject matter specific helper application residing on the client node. Thus, new or modified tutorial applications can be provided to the client node without modifying the software or hardware configuration of the client node.

It is a further aspect of SLOOP to utilize existing, readily available hardware and software components in providing the tutoring assistance on the WWW or another comparable network having network and/or protocol performance constraints limiting real time user interactivity. Thus, as one skilled in the art will appreciate, SLOOP uses Hypertext Transfer Protocols (HTTP) and Hypertext Markup Language (HTML) based technology in communications between a user's client node and a remote network server.

Other features and benefits of the present invention will become apparent from the detailed description with the accompanying figures contained hereinafter.

BRIEF DESCRIPTION OF THE DRAWINGS

FIGS. 7A and 7B present a typical representation of a high level specification 604 communicated from the SLOOP server 512 to the model based UI generator client 520;

FIG. 15 is an example table stored by the present invention illustrating a history of the interactions of a user with the present invention.

DETAILED DESCRIPTION

The present invention is an intelligent tutoring system to be utilized on wide area networks such as the World Wide Web portion of the Internet. In particular, this invention, denoted SLOOP, is embodied in an intelligent tutoring system for tutoring in the design and implementation of software systems using object oriented methods. Thus, the SLOOP intelligent tutoring system is based on a client server architecture and thereby includes both client side modules as well as server side modules. However, before describing either the client or server side modules, a brief high level description is provided here of the World Wide Web pages presented to a user at a client node when using the present invention.

Figure 1:
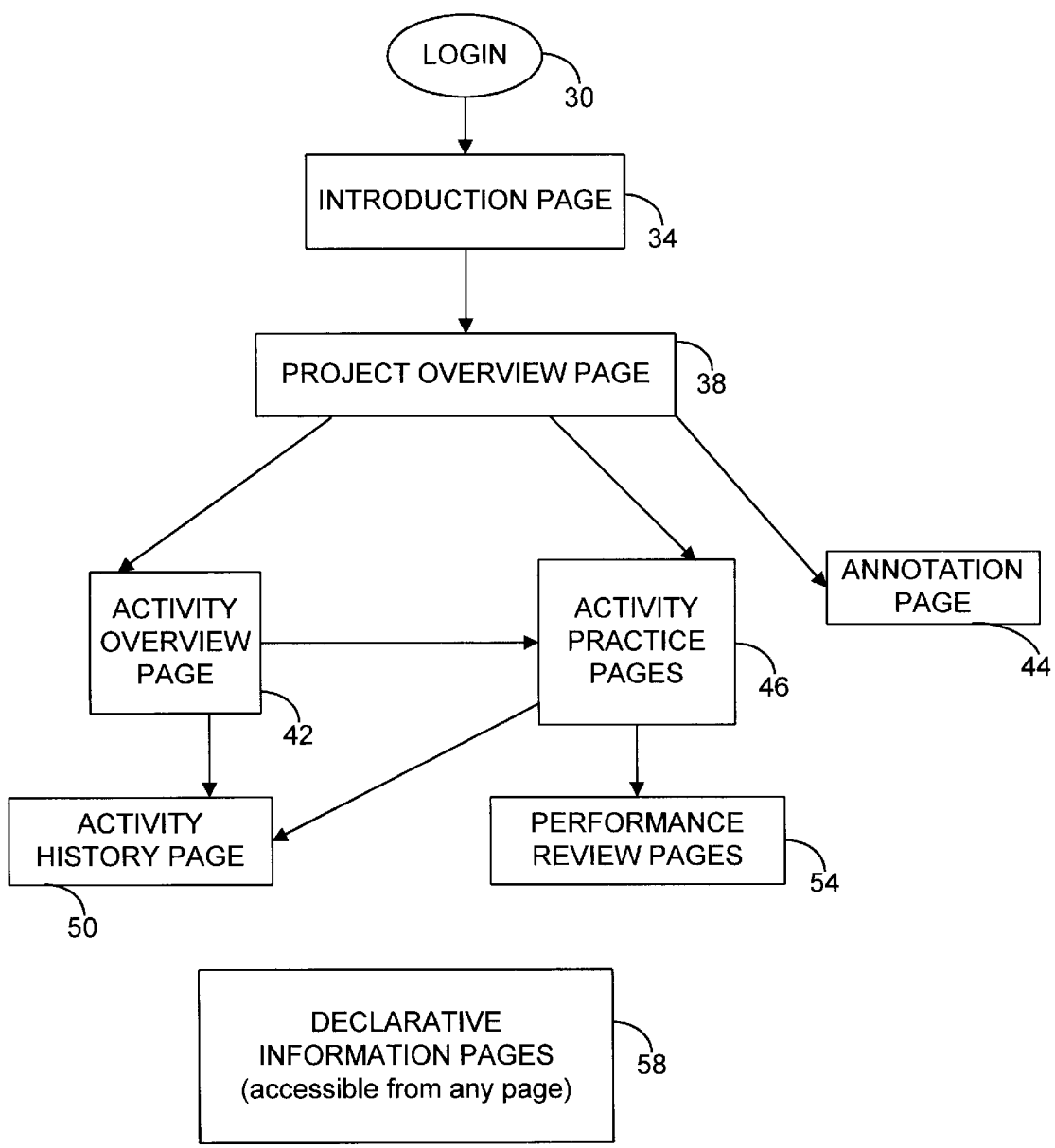
FIG. 1 is a block diagram of the process flow for presenting various tutorial activity pages to a user of the present invention.

Referring now to FIG. 1, a high level diagram is presented showing the sequence or flow between World Wide Web pages that may be displayed at a user's World Wide Web browser when the present invention is being utilized for tutoring. Thus, upon the user logging in (as indicated by oval 30), the user may access seven different types of pages. Introduction page 34 is the first page provided when the user activates the present invention. This page introduces the tutorial system and provides access to an online tutorial on how to use the present invention. Subsequently, assuming the user desires to continue with the tutorial, the project overview page 38 is presented wherein an overview of projects (also known as problem sets) is presented to the user. An example of such an overview page 38 is provided in FIG. 2 and will be discussed in detail hereinbelow. Briefly however, this page allows a user (by the activation of various displayed buttons) to review his/her performance on previous activations of tutorial projects. Additionally, this page provides the user with the ability: (a) to activate a practice session for practicing a particular activity, such as identifying noun phrases in a collection of customer requirement statements(via an activity practice page 46), or (b) to obtain an overview of a particular tutorial activity displayed (via an activity overview page 42), or (c) to supply or review user-supplied comments regarding the project to which the project overview page 38 applies (via the annotation page 44). If the user chooses to have activity overviews presented, then the activity overview page(s) 42 is presented wherein an overview of all activities related to a particular user selected tutorial project is presented. Such an activity overview page 42 is presented in FIG. 3 and will be discussed in further detail hereinbelow. However, such activity overview pages 42, in addition to overviewing the activities of a particular project, allow a user: either to initiate a practice session or to view an activity history or to view the project overview.

Figure 4:
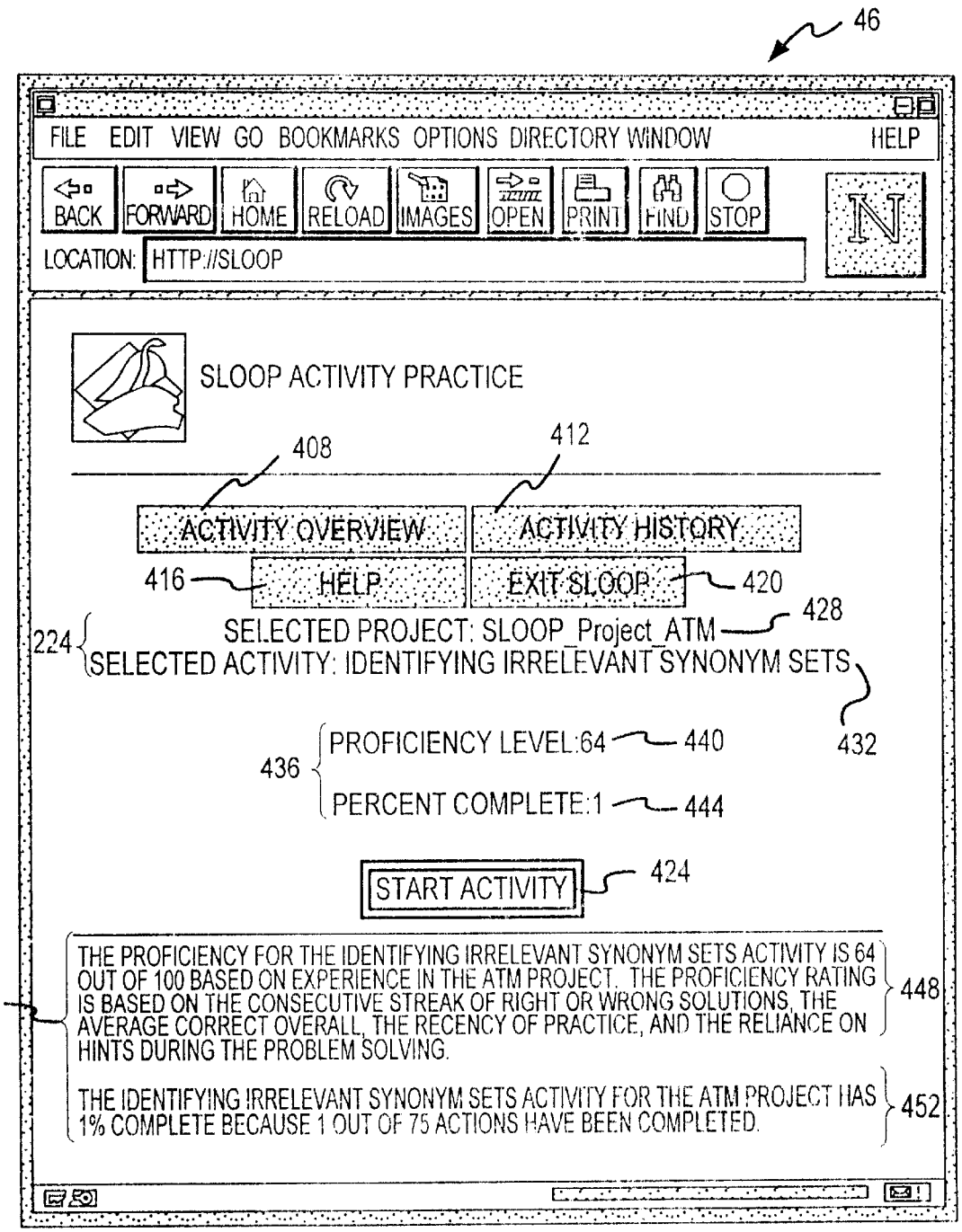
FIG. 4 is a representative example of an activity practice page 46 to a user of the present invention.

Note that activity practice pages 46 are also accessible from a project overview page 38 and an activity overview page 42. Each activity practice page 46 provides a project activity upon which the user may work and wherein if needed, the user may be tutored or coached. A representative activity practice page 46 is presented in FIG. 4. This figure will be discussed in more detail hereinbelow. However, to briefly describe this figure, note that the activity practice page 46 as presented here is used for informing the user as to how well he/she has performed on a particular activity. In particular, page 46 of FIG. 4 shows: (a) the name of the project on which the user is currently working (e.g., "Selected project: SLOOP_Project_ATM" for designing an automated teller machine banking system); (b) the name of the current activity (e.g., "Selected activity: Identifying Irrelevant Synonym Sets", for identifying relevant synonym sets from a textual functional description of an automated teller machine (ATM) system); (c) the user's current proficiency level (if any) regarding this project; and (d) the percentage of complete answers the user has provided thus far.

Note that from either an activity overview page 42 or an activity practice page 46 an activity history page 50 may be accessed. Such an activity history page presents the user with a listing of their experiences in solving a related activity and further provides a way to annotate portions of the activity with self critiquing notes. Additionally, from the activity practice pages 46, performance review information 54 is presented wherein an overall description of the user's performance level on a related activity is provided.

Figure 2:
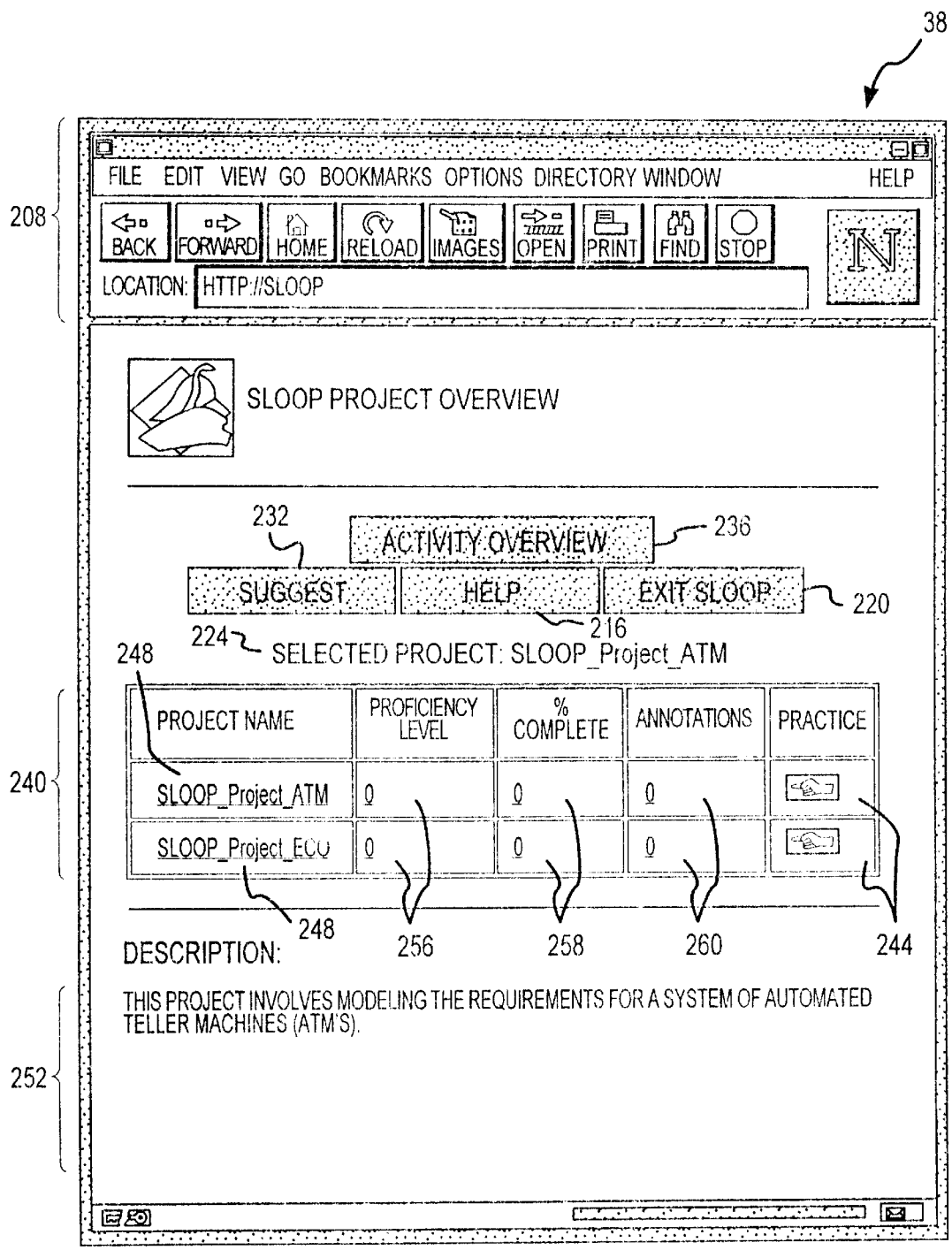
FIG. 2 is a representative example of a project overview page 38 presented to a user of the present invention.

Lastly, FIG. 1 illustrates that the present invention also provides the user with declarative information pages 58 that are accessible from "Hot Spots" (e.g., hypertext links) within any of the tutoring pages following the introduction page 34. Referring now to FIG. 2, one embodiment of the project overview page 38 is provided. In the uppermost portion 208 of this page are the typical operations that a user may perform at a World Wide Web browser such as "NETSCAPE" as one skilled in the art will appreciate. Note that this portion is displayed to the user at the top of substantially every page provided by the present invention. Below the portion 208 is the display directly related to the present invention. This portion has four presentation areas. They are:

(1.1) SLOOP command buttons (constant for all SLOOP pages) for requesting help (by pressing help button 216) and for exiting the tutorial system of the present invention (by activating the exit button 220).

(1.2) A context area 224 for identifying the project and/or the activity selected.

(1.3) Page specific command buttons such as for the page of FIG. 2 there is:

(1.3.1) A suggest button 232 wherein upon activation, the present invention presents a suggestion about what project on which the user may commence, what activity on the project at which the user may start and permits the user to accept or reject the suggestion; and (1.3.2) An activity overview button 236 which when activated presents the user with an activity overview page.

(1.4) A project table 240 wherein each row of the table corresponds to a different project upon which the user may work and wherein each row has five buttons for activating the following executable options:

(1.4.1) The launcher icon or button 244, which when activated, causes the present invention to present to the user an activity page for the related project, the activity page presented being deemed most pertinent to completing the selected project given the user's expertise. That is, if the user has partially or fully previously completed one or more activities related to the project, then the present invention will retain the previous work and allow the user to continue where he/she stopped.

(1.4.2) The project name button 248, which when activated, causes a description of the project related to this button to be presented in the description area 252 (discussed hereinbelow).

(1.4.3) The project proficiency level button 256, which when activated, causes an explanation of the user's proficiency rating for the corresponding project to be presented in the description area 252. Note that the numeric value provided on each of the buttons 256 is a representation of the user's proficiency level on the related project. Further note that the underlining of such numeric values indicates that the user may activate the button to thereby follow a hypertext link to obtain the more detailed explanation regarding the user's proficiency level.

(1.4.4) The percent complete button 258, which when activated, provides further information regarding the currently indicated percent complete that is shown on this button. Additionally, as with the proficiency level buttons 256, the numeric value is underlined to indicate that the user may activate the button to thereby follow a hypertext link to obtain the more detailed explanation regarding the user's completeness percentage.

(1.4.5) The annotation button 260, which when activated, allows the user to access the annotation page 44 for the corresponding project and permits the user to add/view/edit user comments related to the project. Note that the number on each annotation button 260 provides a representation indicating the number of annotations the user has supplied for the project of the associated row of buttons. Further note, as with other buttons here, that when the number is underlined as indicated in FIG. 2, the underlining indicates that the user may activate the button for following a hypertext link to view his/her input annotations.

(1.5) A description area 252, as mentioned above, that is used for presenting explanations, descriptions and simple questions to the user.

Returning to FIG. 3, an activity overview page 42 for the present invention is presented. As with the overview page 38 presented in FIG. 2, the activity overview page 42 of FIG. 3 also has five presentation areas peculiar to the present invention. They are:

(2.1) SLOOP command buttons 216 and 220 for help and system exit respectively.

(2.2) A context area 224 for identifying the project and/or activity that has been selected.

(2.3) SLOOP page specific command buttons:

(2.3.1) A suggest button 232 for suggesting an activity on which the user may work.

(2.3.2) A project overview button 308 that, when activated, allows the user to view a project overview page 38 related to the project to which the present activity overview corresponds.

(2.3.3) An activity history button 312 that, when activated, allows the user to view an activity history page 50 related to the activity associated with the present activity overview page.

Figure 3:
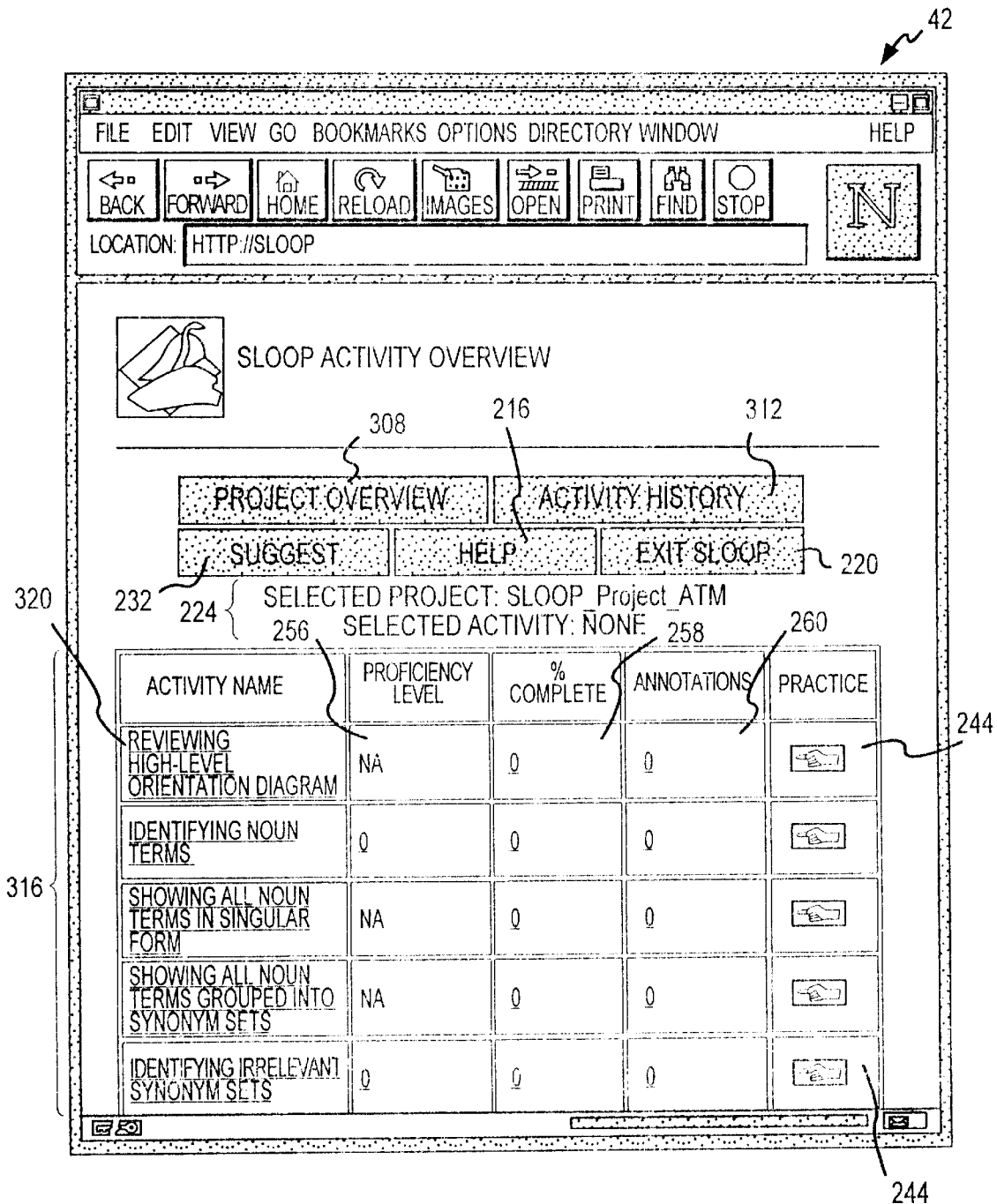
FIG. 3 is a representative example of an activity overview page 42 to a user of the present invention.

(2.4) An activity table 316 that is substantially similar to the project table 240 with the exception that instead of the rows applying to projects as in table 240, the present table 316 has its rows applying to activities related to the project as described in context 224 of FIG. 3. That is, the buttons in the rightmost column of table 316 are launcher icon buttons 244 for activating the activity of the row to which each launcher icon button corresponds. The activity name buttons 320, when activated, cause a description of the currently selected activity to be presented that is similar to the description area 252 of FIG. 2. However, such a description area is not shown in FIG. 3 since the Activity Overview Page 42 is scrollable and the description area is below what is shown in FIG. 3. Further note that the columns related to proficiency level, percent complete, and annotations have identical functionality respectively to the proficiency level buttons 256, percent complete buttons 258 and annotation buttons 260 of FIG. 2 with the exception as indicated before that these buttons in table 316 apply to an activity rather than a project.

Referring again to FIG. 4, an example of an activity practice page 46 is shown. Note that the activity practice page 46 of FIG. 4 is related to the last activity selection row of table 316 in FIG. 3. That is, to obtain a presentation of the activity page 46 of FIG. 4 the user activates the bottommost launch icon 244 in FIG. 3 for obtaining the display of FIG. 4. Further note that portions or components of FIG. 4 having identical functions to those presented in FIGS. 2 and 3 are labeled identically. Thus, for example the description area 224 of FIG. 4 describes the context related to the activity practice page 46 of FIG. 4 wherein: (a) the selected project is the ATM project activated, for example, from the topmost row of project selections from table 240 of FIG. 2, (b) the selected activity, Identifying Irrelevant Synonym Sets, may have been, for example, selected from the bottommost row of table 316 from FIG. 3.

Additionally, the activity practice page 46 of FIG. 4 includes the following presentation areas:

(3.1) Activity practice page specific command buttons:

(3.1.1) An activity overview button 408 for allowing the user to display the activity overview page 42.

(3.1.2) An activity history button 412 that, when activated by the user, causes an activity history page 50 for the same project to be displayed.

(3.1.3) A help button 416 that, when activated, causes an appropriately related user help page (not shown) to be displayed.

(3.1.4) An exit button 420 that replaces the present activity page 46 with the immediately previously accessed page from which the present activity page 46 was accessed (i.e., this previous page is either the activity overview page 42 or the project overview page 38).

(3.1.5) A start activity button 424 for activating a model based user interface (MBUI) in which the user may solve the current activity. Note that this MBUI (not shown) and the activity practice page 46 are simultaneously displayed for the user. In particular, it is important to note that the MBUI is not displayed via the World Wide Web browser discussed in describing FIG. 2. Instead, the MBUI is provided in a window separate from the World Wide Web browser display. Also note that the presentation of each such MBUI is dependent on the nature of the current activity to which the MBUI pertains. However, each such MBUI provides a menu for coaching the user in solving the activity to which the MBUI pertains.

(3.2) A selected project area 428 that identifies the name of the currently selected activity (e.g., "SLOOP_Project_ATM").

(3.3) A selected activity area 432 for describing the currently selected activity (e.g., "Identifying Irrelevant Synonym Sets") for the currently selected project.

(3.4) A status description area 436 for presenting information related to the user's performance of the currently selected activity. In the activity practice page 46 presented in FIG. 4, the status description area includes the following sub-areas:

(3.4.1) A user proficiency level area 440 for providing the user with an indication as to how well the user is perceived to have mastered the material to be learned in the present activity. Note that in the present embodiment, the proficiency level is described by an integer in the range 0 to 100, wherein the proficiency level value increases as the present invention determines that the user has correctly performed more of the present activity.

(3.4.2) An activity completeness area 444 that provides the user with an indication of how much of the present activity the user has completed. Note that in FIG. 4, the completeness area provides a numerical value indicating a percentage of completeness of the current activity.

(3.4.3) A textual performance description 448 describing in further detail the meaning of the value in the proficiency level area 440.

(3.4.4) A textual completeness description area 452 for describing in further detail the percent complete value provided in completeness area 444.

Referring now to the model based user interface (MBUI) (not shown), note that this interface is provided by an MBUI environment maintained by the present invention substantially on the user's Internet client node. Thus, the MBUI environment displays appropriate user interfaces for the user to solve the current activity and the specific user interface displayed is based on the activity to be solved. However, each such MBUI contains a coaching menu that allows the user to request assistance in completing the presently presented activity. Note that the coaching menu includes buttons for activating various user assistance capabilities of the present invention. These capabilities are described as follows:

(4.1) An "evaluate" menu selection for presenting text describing the user's current progress in the solution of the current activity. The text notifies the user of the following conditions: (a) the current activity does not require any work by the user; (b) the user has not provided any portion of the solution; (c) the activity has been completed and is correct; (d) the present solution contains one or more errors; (e) the present solution contains no errors but is incomplete; or (f) the present solution contains no errors and is not complete but the user has reached a sufficient proficiency level that the activity may be completed automatically by the present invention if the user desires. Note that the evaluate menu selection is automatically enabled when the user is performing an activity and has not completed the activity.

(4.2) An "evaluate with hints" menu selection for presenting to the user text describing the user's current progress on the solution in the current activity in substantially the same form as the evaluate menu selection does when activated. Additionally, the present coaching capability also presents text giving the user hints about how to effectively complete the present activity. Note that the evaluate with hints menu selection is also enabled whenever the user is in the midst of completing an activity.

(4.3) A "show suggestion" menu selection for presenting text to the user describing one action that the user may perform to progress from the user's current solution to a more correct solution. Note that if the user's current solution has no mistakes, then the text presented by this coaching capability instructs the user in performing an additional correct step towards the complete solution. However, if there are mistakes in the current solution, then the text presented here either indicates how to remove a mistake or to replace a mistake with a mistake correcting action. Note that as with the two coaching capabilities described above, the show suggestion menu selection is enabled when the user is performing an activity and has not completed the activity.

(4.4) A "demonstrate" menu selection for demonstrating a particular action to the user as an illustration of how the user may progress from his/her current solution to a more correct solution of the present activity. Further note that the selected action to be illustrated is described in text as well as automatically applied to the user's current solution of the present activity. Also note that the demonstrate menu selection is enabled for user activation whenever the user is in the midst of an activity but has not completed the activity.

(4.5) A "complete activity" menu selection that allows the user to have the present invention present a correct solution to the user. Note that this menu selection is enabled for user activation when the user has not completed the activity at hand and the user has reached a sufficient proficiency level as determined by the present invention.

(4.6) An "erase work" menu selection for erasing all of the user's current solution to the present activity and reinitializes the activity so that it is in the same state as when the user first encountered it. Note that this menu selection is enabled after the user has started an activity.

(4.7) A "next" menu selection for advancing the user to the next activity and closing the current activity. Note that the next activity is presented with the user's current solution if the user has worked on this activity before. Further note that this menu selection is enabled when the current activity is complete and this current activity is not the last activity.

(4.8) A "previous" menu selection for providing the user with the capability to back up to a previous activity by closing the current activity and opening the preceding activity. Note that the preceding activity is presented with the user's current solution to this activity. Further note that this menu selection is enabled when the current activity is not the first activity.

(4.9) A "exit" menu selection for closing the current activity and returning the user's focus to the related activity practice page 46. Note that the exit menu selection is always enabled.

Note that similar descriptions as to FIGS. 2–4 may be given for activity history pages 50 and performance review pages 54. However, to simplify the discussion of the present invention only a brief discussion of these two later types of pages is provided. In particular, a brief description of each page's presentation areas and invocable commands will be discussed here. Thus, regarding an activity history page 50, the presentation areas for this type of page are:

(5.1) The name of a current activity and project.

(5.2) The percentage of the activity that has been completed for the present project.

(5.3) The history of the user's inputs for the presently selected activity. Note that the history of the user's inputs is provided in a table 1500 (FIG. 15) that is included in the history activity page 50. In providing a history of the actions taken by the user for the selected activity, each action in the history list displays five attributes of a previous action. These are:

(5.3.1) The type of action taken by the user (provided in the column labeled "action"). Note that each previous action performed is denoted as an added, removed or replaced action denoting that the user has added, removed or replaced, respectively, an item presented in the current activity.

(5.3.2) A text description of the modification associated with the action denotation of (5.3.1) that is in the same row. Such descriptions are in the column labeled "item" and each text description typically indicates the value of an item that has been changed in the present activity by the user.

(5.3.3) In the column denoted at the top "rating," each previous user action presented is labeled as being a correct or incorrect action by the words "correct" and "incorrect," respectively.

(5.3.4) In the column labeled "type," each previous action displayed is annotated to indicate the (any) coaching assistance provided by the present invention. The "type" field for each row of table 1500 describing a previous action may have one of the following four values: (a) "no help" (indicating that no help or assistance was provided to the user); (b) "hint shown" (indicating that a hint as to how to proceed on the related activity was provided); (c) "suggestion shown" (indicating that an explicit instruction regarding some portion of the related action was provided); or (d) "demonstration" (indicating a step-by-step demonstration of some portion of the related action was presented to the user).

(5.3.5) A "time" column giving the time and date when the user performed the related action.

The commands invocable from the history activity page 50 are:

(6.1) A describe command that presents further explanation to the user of an item listed in the history table of the actions for the related activity.

(6.2) A help command that, when activated, presents the user with a help page related to the activity history page 50.

(6.3) An exit command that, when activated, saves the user's current tutorial session (at a central network server such as a WWW server, as will be described below) and subsequently concludes the user's session. Note that the user can reactivate the tutoring system 20 of the present invention and continue work where he/she stopped.

Similarly, regarding a performance review page 54, the following presentation areas are provided:

(7.1) The name of the current activity and project.

(7.2) The current proficiency level of the user on the current activity. Note that various projects may require substantially the same activity to be performed by the user. Thus, the current proficiency level for an activity may be a measurement related to the performance on the activity across all projects in which the user has attempted the activity.

(7.3) A presentation area for presenting statistics related to a user proficiency model maintained within the present invention. This model, as will be described in further detail below, is used in determining how best to respond in facilitating the user's learning of the material being presented by the tutoring system of the present invention. The user proficiency model is presented as a table providing statistics on the tasks that have been performed related to the present activity. In particular, the following fields are presented: the average number of correct tasks performed, the current consecutive number of correct answers provided, the time elapsed since the last task was correctly answered, the number of hints that have been given on the present task, and the number of demonstrations that have been provided on the present activity.

(7.4) An improvement list area that shows the concepts and activities that the user needs the most improvement upon.

(7.5) A description area for dynamically presenting to the user explanations, descriptions and simple questions.

Additionally, the following commands may be invoked from a performance review page 54:

(8.1) A filter activity history command that allows the user to review his/her responses to the tasks completed within the present activity, wherein the user may filter these tasks for presentation according to the options: (a) the tasks performed correctly; (b) the tasks performed incorrectly; (c) the tasks on which the user activated the demonstrate option; (d) the tasks on which the user activated the evaluate hints option; and (e) the tasks on which the user activated the show suggestion option.

(8.2) An annotate command permitting the user to add/view/edit a comment about any currently selected task from the history table for the present activity.

(8.3) An exit command that, when activated, saves the user's current tutorial session (at a central network server, as will be described below) and subsequently concludes the user's session. Thus, the user can reactivate the tutoring system 20 of the present invention and continue work where he/she stopped.

Figure 5A:
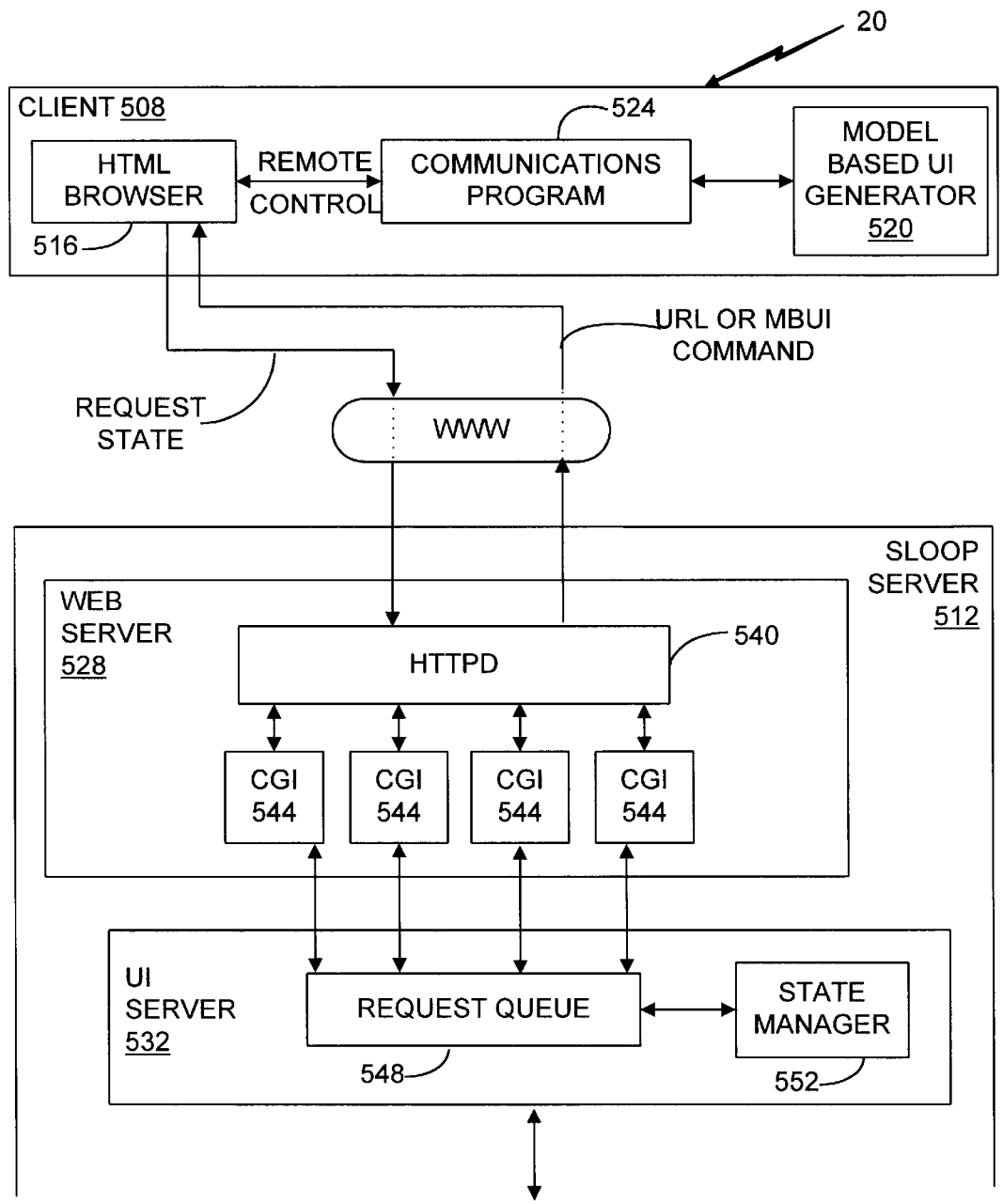
FIGS. 5A and 5B present a block diagram of the hardware and software components of the present invention.
Figure 5B:
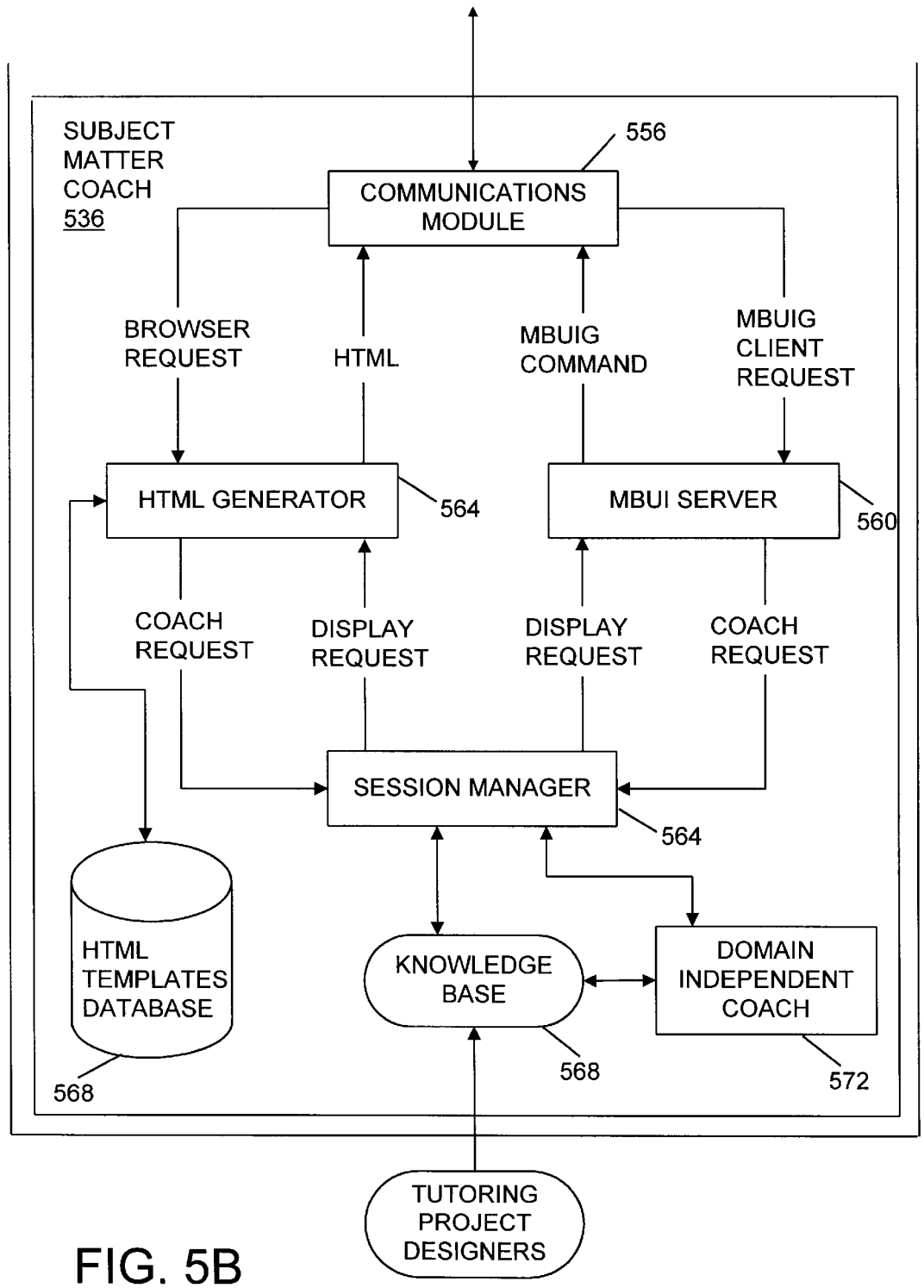

Referring now to FIG. 5, this figure presents a high level block diagram of the present invention. Note that the tutoring system 20 of the present invention is embodied in a client/server architecture wherein portions of the invention are provided on the client node (or simply client) 508 while other portions of the present invention are provided on the SLOOP server 512. More precisely, the present invention is directed toward a tutoring system wherein the client 508 and the SLOOP server 512 are distinct nodes on a wide area network such as, for example, the World Wide Web wherein the communication protocol between the client and the SLOOP server is not conducive to frequent potentially high bandwidth communications that may be necessary to respond to a user's input in any one of a number of user interaction areas presented to the user. In particular, the Hypertext Transfer Protocols (HTTP) utilized on the World Wide Web is an example of the types of protocols considered here. That is, communications using such protocols between a client and server nodes may become a bottleneck to effective tutoring system 20 performance unless an architecture substantially different from the typical World Wide Web client server hypertext document transfer paradigm is provided.

Accordingly, the architecture for the present invention is novel in that instead of the SLOOP server 512 responding to client 512 requests with communications for precisely specifying a user interface to be presented to a user of the client 508, the present tutoring system 20 may respond with instructions for manipulating application or tutorial objects without precisely defining the user interface to be presented to a user. Thus, it is necessary for the client node 508 to use such input commands to dynamically generate a user interface having appropriate presentation areas, user interaction techniques, and a consistent user interface layout without these user interface features being specified in the communication between the SLOOP server 512 and the client node 508. That is, in addition to the client node 508 having a conventional Hypertext Markup Language (HTML) browser 516, the present invention also provides a model based user interaction generator (MBUIG) client 520 for dynamically constructing a user interface that is consistent with such commands received from the SLOOP server 512. Further, in order to communicate effectively between the HTML browser 516 and the MBUIG client 520, the present invention provides a communications program component 524 for buffering data and translating data structures between the HTML browser 516 and the MBUIG client 520.

Referring now to the SLOOP server 512 of FIG. 5, it includes three high level components:

(9.1) A web server 528 for processing HTML data transmissions (via HTTP). The web server 528 translates data between the formalism(s) of the World Wide Web and the internal data structures used in other components of the SLOOP server 512.

(9.2) A UI server 532 for queuing communication requests between the web server 528 and the subject matter coach 536 (described below).

(9.3) A subject matter coach 536 for providing the tutoring or coaching capabilities of the present invention.

Referring to web server 528, it includes a hypertext transfer protocol daemon (HTTPD) 540 for interfacing with the World Wide Web (WWW) so that the requests from the HTML browser 516 and state information from this browser are received by HTTPD 540 and so that, in response, commands may be supplied to the MBUIG 520 via the HTML browser 516. Further, the web server 528 includes a common gateway interface (CGI) program 544 (or instantiations thereof) that is activated by the HTTPD 540 for translating between the data structures of the World Wide Web and the data structures of the subject matter coach 536. Note that several instantiations of the common gateway interface program may be executing simultaneously, depending on, for example, the number of users accessing the SLOOP server 512 from client nodes 508.

Note that each common gateway interface program instantiation 544 (or simply CGI 544) can process two types of client 508 requests received from the HTTPD 540. The two types of requests are: gateway URL (Universal Resource Locator) requests and HTML form requests. The gateway URL requests are used for textual HTML links while the HTML form requests are used for "button" HTML links. That is, URL gateway requests are generated by the HTML browser 516 whenever hypertext links are activated by the user, and HTML form requests are generated whenever a user interface button is activated by the user. Note that such gateway URL requests are sent to the HTTPD 540 from the client node 508 as part of a URL identifying the SLOOP server 512. Further, the gateway URL is processed via environmental variables in each CGI 544, wherein such requests are typically used for retrieving HTML pages.

Regarding the HTML form requests, these are specified using the FORM tag with the POST method in the HTML document, as one skilled in the art will appreciate. Such requests are sent to the HTTPD in a data body rather than as part of the URL and the requests are processed via the "standard-in" communication channel to each CGI 544.

Note that both the gateway URL requests and the HTML form requests provide the following: (a) information relating to the identity of the user initiating such a request; (b) an identification of the current tutoring session activated by the user; and (c) any SLOOP server 512 command request (e.g., a coaching request, a previous tutoring page, and/or a help page). Additionally, note that in the case of a coaching command requesting evaluation of the user's work, the request also includes contextual information describing the current user's solutions to the task and/or activity being performed.

Regarding the UI server 532 of (9.2), a request queue 548 is included for communicating with each CGI 544 and for also communicating with the subject matter coach 536. Note that communication between the subject matter coach 536 and the request queue 548 is performed using network communication via ports. This allows the subject matter coach 536 to reside on a processor different from the processor upon which UI server 532 executes. Additionally, the UI server 532 also includes a state manager 552. The state manager 552 monitors HTML pages provided to the browser 516 from the subject matter coach 536. Further, the state manager 552 also checks the validity of HTML pages requested from the subject matter coach 536 by the browser 516. For example, a user (at a client node 508) may inadvertently request an HTML page that is invalid in that a tutorial session, for example, may have been terminated with one or more tutoring system 20 pages still available to the user at the HTML browser 516 whereby the user may attempt to access related tutoring system pages via the SLOOP server 512. Note that checking the validity of an HTML page saves processing by the subject matter coach 536 by eliminating unnecessary communication therewith. Further note that when the user logs into the SLOOP server 512 (via a client 508), the state manager 552 creates a log file entry for each HTML page request. For each entry, the log file is updated with the following information: (a) the name of the HTML page, (b) a unique HTML page identifier; and (c) the time the page was requested. Referring now to the subject matter coach 536, it includes a communications module 556 for providing communications with the request queue 548. The communications module 556 receives communications from the request queue 548 and routes communications as appropriate to other modules within the subject matter coach 536. Note that the communications module 556 uses a TCP/IP socket on a "well known port number," as one skilled in the art will appreciate. Thus, the communications module 556 continually monitors the well known port for a connection from the request queue 548. Further, upon receiving a request from the request queue 548, the communications module 556 determines whether the request was initiated from the HTML browser 516, the MBUIG client 520, or both. Thus, the communications module 556 routes the request (or appropriate portions thereof) to the MBUI server 560 or the HTML generator 564 (both of which are described hereinbelow). Further, the communications module 556 outputs information bound for client nodes 508, such information being either a URL or a command for the MBUIG client 520 via the request queue 548 and the HTML browser 516.

The model based user interface (MBUI) server 560 is used for parsing MBUIG client 520 requests regarding user tutoring assistance when such information is not available at the MBUIG client 520. Further, upon receiving such a request the MBUI server 560 parses the request and outputs it to the session manager 564 (discussed hereinbelow). Additionally, the MBUI server 560 receives display requests from the session manager 564 as a response to an MBUIG client 520 request. Note that as will be described hereinbelow, such display requests (intended ultimately for the MBUIG client 520) describe high level specifications of user interface display semantics (i.e., tutoring information interpretable by the MBUIG client 520) and, optionally, general hints or preferred display characterizations related to the look and feel of the user interface to be provided to the user via browser 516. Upon receiving such a display request, the MBUI server 560 transforms it into MBUI commands for outputting to the communications module 556. Thus, the MBUI server 560 is a bi-directional translator for translating between data structures understood by the MBUIG client 520 and the session manager 564.

The HTML generator 564 is used for: (a) accepting browser 516 requests from the communications module 556 and (b) generating, in response to these requests, HTML documents from HTML templates provided in the HTML template database 568, the newly generated HTML documents being subsequently output to client nodes 508. Note that in generating such HTML documents for return to the browser 516, the HTML generator 564 receives display request information from the session manager 564 providing information related to the type of HTML document to be generated. Further note that the HTML generator 564 uses the input browser request (from the communications module 556) for, in turn, generating a request to the session manager 564 regarding the browser request so that tutorial model based components (discussed hereinbelow) of the subject matter coach 536 may determine the types of information to be displayed (at the HTML browser 516) by an HTML document generated by the HTML generator 564.

As discussed above, both the HTML generator 564 and the MBUI server 560 communicate with the session manager 564. This manager maintains a context for each active tutoring session by a user interacting with an HTML browser 516 from a client node 508. Thus, the session manager 564 maintains and provides the following aspects of a tutorial session:

(10.1) A user ID, such as the user's SLOOP server 512 login name.
(10.2) Project ID; i.e., an identifier identifying the current project on which the user is working.
(10.3) Activity ID; i.e., an identifier identifying the current activity (with the current project on which the user is working).
(10.4) The URL of the previous HTML page output by the SLOOP server 512 to the user's client node 508.
(10.5) The time of the most recent request to the SLOOP server 512.
(10.6) The identity of the current or most recent action and/or request from the user.
(10.7) The text of the most recent coaching message provided to the user.

Regarding the knowledge base 568 and the domain independent coach 572, these components cooperate to provide coaching capability of the present invention. That is, the knowledge base 568 provides and maintains the knowledge representations for information describing or modelling each user's tutoring system 20 interactions, and the domain independent coach 572 uses information in the knowledge base 568 to interact with each user as a knowledge domain (e.g., object oriented design) expert coach.

In more detail, the knowledge base 568 includes information relating to three perspectives of a learning process (and, in particular, to the object oriented modeling process): the activity perspective, artifact perspective and the agent perspective. The activity perspective maintains information related to the tutorial process in terms of the modelling activities performed. In particular, temporal and logical ordering of activities are maintained. The artifact perspective defines the artifacts (i.e., work products produced) resulting from the execution of a tutorial process. For example, the requirements modeling portion of a tutorial process results in a requirements model. The agent perspective defines the distribution and sharing of knowledge, skills (related to activities performed), and responsibilities (for artifacts produced or effected) among agents, human or software. Note that at least with regard to knowledge, the agent perspective includes the information required to perform activities correctly and to detect defects.

Thus, the knowledge base 568 explicitly represents each tutorial project in terms of: (a) its object-oriented modeling activities; (b) the artifacts produced by those activities (that is, correct work products for solving the problem to which the project is directed); and (c) the knowledge about how to produce such artifacts (e.g., explanations related to artifacts in each solution).

Note that these perspectives are not unique to object-oriented modeling, but rather apply to any software development process. One skilled in the art of software engineering will be familiar these ideas, which have also been published in the technical literature, for example: Hurley, W. D., 1993, "A process model for interactive systems," Journal of Systems Integration, Vol. 3, No. 3/4, pp. 251–271, which is herein incorporated by reference.

The knowledge base 568 further provides knowledge acquisition functions and query functions. The knowledge acquisition functions are used by project designers to input into the knowledge base 568 the descriptions of individual projects, as described by their activities, artifacts and artifact production knowledge. The query functions are used by other SLOOP server 512 components to retrieve from the knowledge base 568 information about specific user projects. For example, the domain independent coach 572 may retrieve information about the correct solution for a project and use that information to evaluate a user's solution to an activity.

Referring to the domain independent coach 572 module, it is responsible for responding to coaching requests from the session manager 564. The domain independent coach 572 can be applied to any knowledge domain and therefore is not dependent on the specifics of a particular tutorial activity and project in the knowledge base 568. The domain independent coach's responsibilities are to:

(11.1) Store and retrieve the previous user's solutions to project activities.

(11.2) Provide suggestions about what project or activity on which a user should work next.

(11.3) Evaluate a user's solution (comparing their solution to the correct solution stored in the knowledge base 568).

(11.4) Produce suggestions about what actions in an activity would best help the user to solve the whole activity.

(11.5) Decide whether a user is proficient enough in an activity that the user may have it automatically completed (this condition is met when a user reaches above a predetermined proficiency for an activity).

(11.6) Provide the percent complete for a project or an activity (e.g., the percentage in completeness area 444).

(11.7) Provide a proficiency rating for a project or an activity (e.g., the proficiency value of proficiency level area 440).

(11.8) Provide textual explanations of percent complete and proficiency numbers (e.g., as in areas 448 and 452).

(11.9) Determine which coaching buttons are to be enabled at any given time for the user to seek assistance.

Further, by using references to the knowledge represented in the agent perspective and the activity perspective of the knowledge base 568, the domain independent coach 572 can describe what knowledge is required to perform each activity. Also, by using references to the artifact perspective and the activity perspective, the domain independent coach 572 can describe what artifacts each activity produces and what changes to existing artifacts should be made. Note that each activity can be considered to be partitioned into two parts: a specification part and a design part. The activity specification part provides an external view of the activity, describing its inputs (artifacts) and its outputs (changes to artifacts or new artifacts). The activity design part describes a plan (a logical ordering of other activities) for accomplishing the given activity.

Model Based User Interface Generator (MBUIG) Client 520

The MBUIG client 520 is based on the work of Srdjan Kovacevic in Kovacevic, S., *A Compositional Model of Human-Computer Interaction,* DSc dissertation; The George Washington University, 1992b, herein incorporated by reference. However, a brief overview of the functionality of the MBUIG client 520 is given here.

Figure 6:
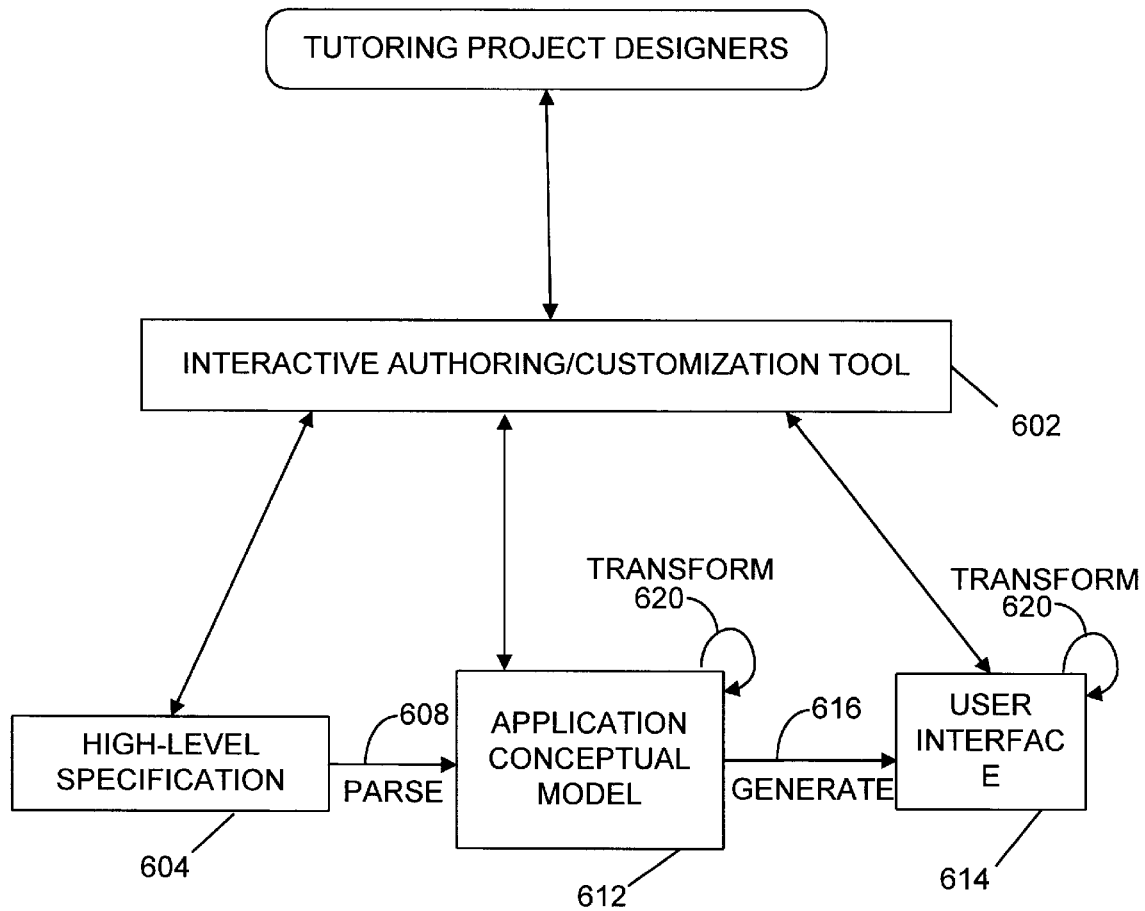
FIG. 6 illustrates the processing performed by the model based UI generator client 520 when generating a user interface from a high level specification 604.

The MBUIG client 520 supports the user interface generation process shown in FIG. 6 for generating, on the client node 508, a user interface responsive to the user's actions entered via the HTML browser 516. The bolded components in FIG. 6 illustrate processes performed at run time by the MBUIG client 520. In FIG. 6, a user interface 614 is generated from a high-level user interface specification 604 (or simply specification 604). Such a specification 604 (provided by the SLOOP server 512 via the HTML browser 516 and discussed hereinbelow) describes "application semantics" and, optionally, guidelines of a desired user interface look and feel to be generated. Note that the term, application semantics, is used here to denote the content to be displayed and the actions enabled by a resulting generated user interface. The MBUIG client 520 parses the high-level specification 604 (at 608) to obtain an application conceptual model 612. The application conceptual model 612 defines application information requirements and interface components such as dialog boxes and buttons. A user interface 614 is subsequently generated to meet these requirements via generate step 616 and transform step 620, as one skilled in the art will appreciate. Note that guidelines of the desired look and feel provided in the specification 604 are associated with user interface components defined in the application conceptual model 612 as user interface hints. Furthermore, in generating the resulting user interface 614 from the application conceptual model 612, the desired look and feel of the specification 604, when feasible, is incorporated into the user interface.

The generation process is described in more detail using the example of FIG. 7 that illustrates a high level user interface specification for the SLOOP practice activity, Identify Static Associations, wherein this practice activity is a step in the process of teaching the user how to build an object oriented model by identifying static relationships among entities provided in a project description on which the user may work. Note, however, that the discussion here has been simplified in order to better focus on salient points of the user interface generation process. However, one skilled in the art will find sufficient details here for making and using the present invention. Note that an interactive authoring tool 602 can be used by a tutorial project designer to create an initial specification, as well as to modify (transform) the application and its user interface (while preserving its functionality, as discussed in Foley J., Kim W. C., Kovacevic S. and Murray K., "UIDE—An Intelligent User Interface Design Environment," in *Architectures for Intelligent Interfaces: Elements and Prototypes,* Sullivan J., Tyler S., eds., Addison-Wealey, 1991, herein incorporated by reference) using changes propagated back to the specification.

Figure 8:
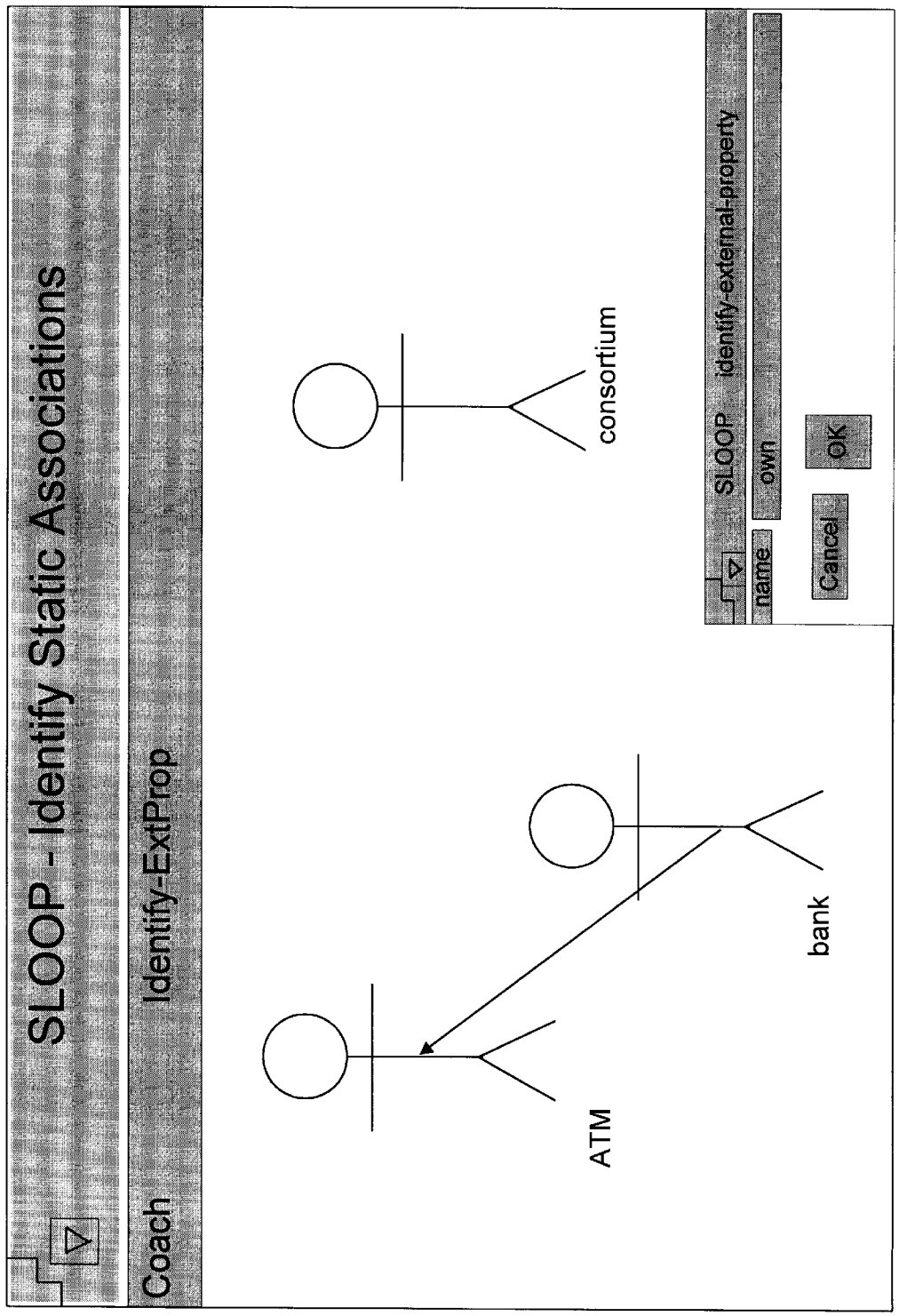
FIG. 8 is an example of a user interface generated by the specification 604 of FIG. 7.

Referring to the specification 604 in FIG. 7, and the resulting user interface in FIG. 8, a discussion is provided of how this graphical, direct manipulation interface of FIG. 8 is produced from the specification of FIG. 7.

High-level User Interface Specification

The specification 604 of FIG. 7 includes four parts describing the initial context 708 (after ":init" keyword), data types 712 (after ":data" keyword), data model 716 (after ":objects" keyword), and control model 720 (after ":actions" keyword). The initial context 708 is specified in terms of instances of project objects to be created at start up time. The data model 716 describes application objects, their attributes and relationships. The control model 720 specifies application actions, their parameters, pre- and postconditions, and relationships to other actions (task structure) and objects.

The specification provides four types of information: application semantics, initial context, user interface hints, and design transformations. Only the first one is necessary, the other three are optional. Application semantics are defined in terms of the data and control models. The initial context can be defined only at the application level, while user interface hints and design transformations can be defined at different levels, associated with the application component as a whole, or with the lower level components such as objects, actions and parameters, as one skilled in the art will understand.

The high-level specification 604 is directly translated into an application conceptual model 612, and then into a user interface 614, as is described in the following subsections. Note that such a high-level specification 604 may serve as an external, persistent representation of its corresponding application conceptual model 612 and its user interface 614, wherein the specification 604 may be stored and communicated between the server and a client 508, and as such it facilitates interface transport. That is, the specification 604 defines the application conceptual model 612, but not the user interface 614.

Without going into all the details of the specification 604 syntax, note that each tutorial system concept embodied in FIG. 7 has a set of properties that can be defined, and each property is specified as a keyword/value pair "keyword value" where value can be a single token or a list of tokens. Note that keywords typically begin with ":" and are shown bold in FIG. 7. For instance, the top level of specification 604 corresponds to the application concepts having keywords: :application-header (for application name), :ui (user interface hints), :init (initialization information), :data (user-defined data types), :objects (data model definition), and :actions (control model definition). The properties can be specified in any order.

The example shown in FIG. 7 specifies that the application Static Associations 702 has: (a) one user-defined data type (cardinality, inline 712); (b) a data model 716 comprising four object classes (noun-phrase, actor, object-class, and external-property); and (c) a control model 720 with five actions (CoachAssistance, CoachHint, identify-actor, identify-object-class, identify-external-property). Note that each built-in object, in turn, also may reference a user-defined type which can be used when defining object attributes and action parameters. For instance, the actor object specification 722 has attribute cardinality of (user-defined data) type cardinality as well as attribute external-properties of (user-defined object) type external property. The object external-property also has attributes of object type origin and target which point to an instance of either object-class or actor object class. Note that each external-property must have one and only one value for attributes origin and target, this single-valuedness being the default for any attribute and parameter. On the other hand, each object-class or actor object class can have any number of relations, indicated by ":set-max nil" (i.e., no upper limit on number of values).

User interface hints are defined at several levels in specification 604: at the application level they specify that the application will use for its main window a dialog box template Graphical 724 which will be named "Identify Static Associations" (at 726) and will have a top level menu bar. User interface hints for object classes 728 (not shown) specify what presentation objects to use and how to configure them. For the control model 720, the hints specify what window to use, if needed, and for action parameters what interaction techniques to use and how to configure them. For instance, the ChoiceSelection technique 732 allows the specifying of where to get items forming the list of choices and how to present the items as one skilled in the art will appreciate. In the case of the parameter noun-phrase 736 of the action identify-actor 740, the interaction technique knows (from the parameter type) that choices are instances of object class noun-phrase and the hint specifies that these instances be present using the value of their attribute name 744. For the action identify-external-property 748 user interface hints specify that both the origin 752 and target 756 parameters should be selected using a mouse (MouseButton interaction) However, to prevent ambiguities as to which attribute's value is selected, the hints specify th at a button release 760 selects the target parameter 756, and a button press (a default button operation) selects the origin parameter 752.

Note that each tutorial practice activity provided by the present invention can have a number of requests for different kinds of coaching assistance and help. For simplicity , the example of FIG. 7 has only two such coaching actions, CoachAssistance 764, and CoachHint 768, which will both be placed in a submenu Coach 772 in the main menubar.

Application Conceptual Model

The user interface 614 is not generated directly from the specification 604, but rather from the application conceptual model 612 (or simply application model), which is, in turn, instantiated based on the specification 604 content. The application conceptual model 612 provides an internal (or non-displayable) representation of the information contained in the specification 604, wherein the application model describes the semantics or behavior of a corresponding user interface, but not its precise form or arrangement. Further, the application is subsequently used by the actions generate 616 and transform 620, as described in Kovacevic, S., *A Compositional Model of Human-Computer Interaction,* DSc dissertation; The George Washington University, 1992b, incorporated herein by reference.

Figure 9:
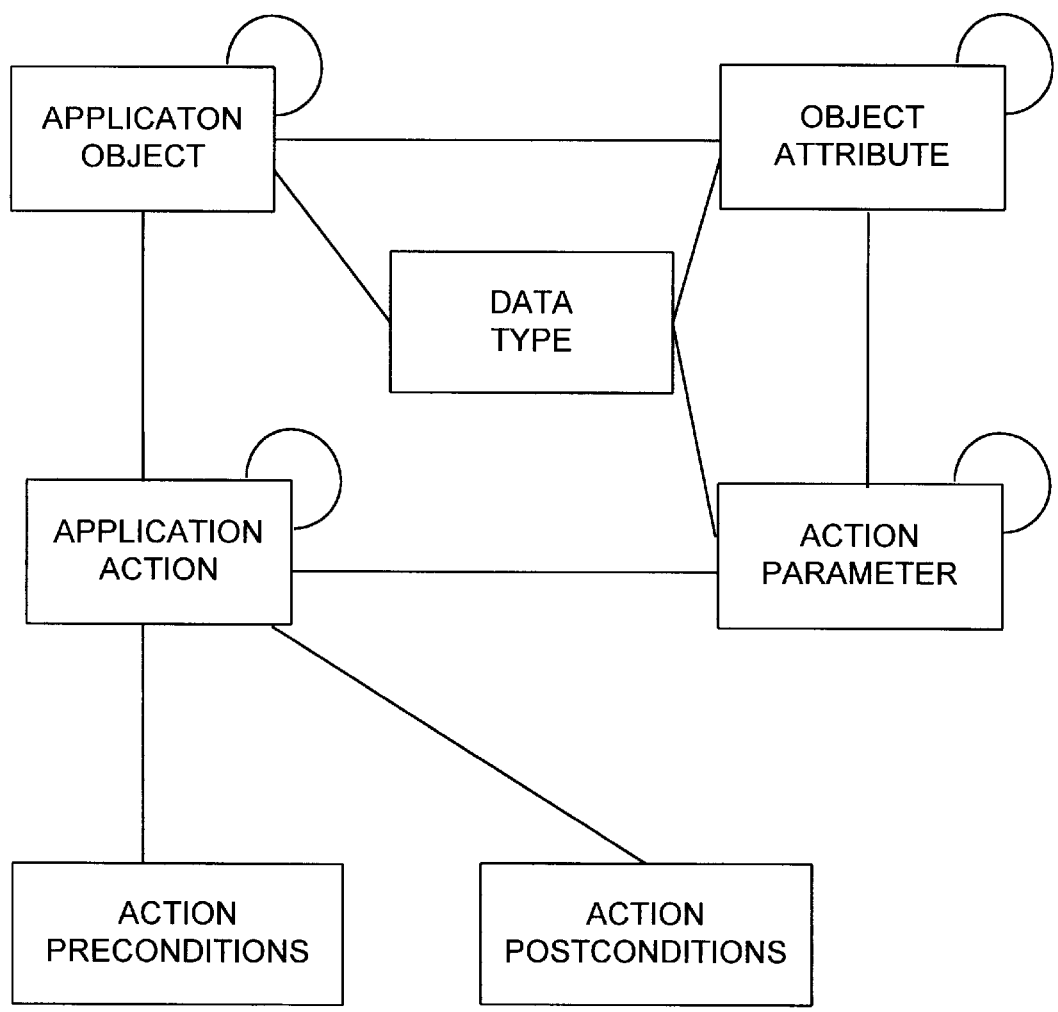
FIG. 9 illustrates the data types and their linkages used within the application conceptual model 612.

FIG. 9 shows the seven entity types that may be instantiated in an application conceptual model 612 and their relations to one another, as one skilled in the art will appreciate. More details on the application conceptual model 612 can be found in the immediately above-mentioned reference of Kovacevic, S.

Figure 10:
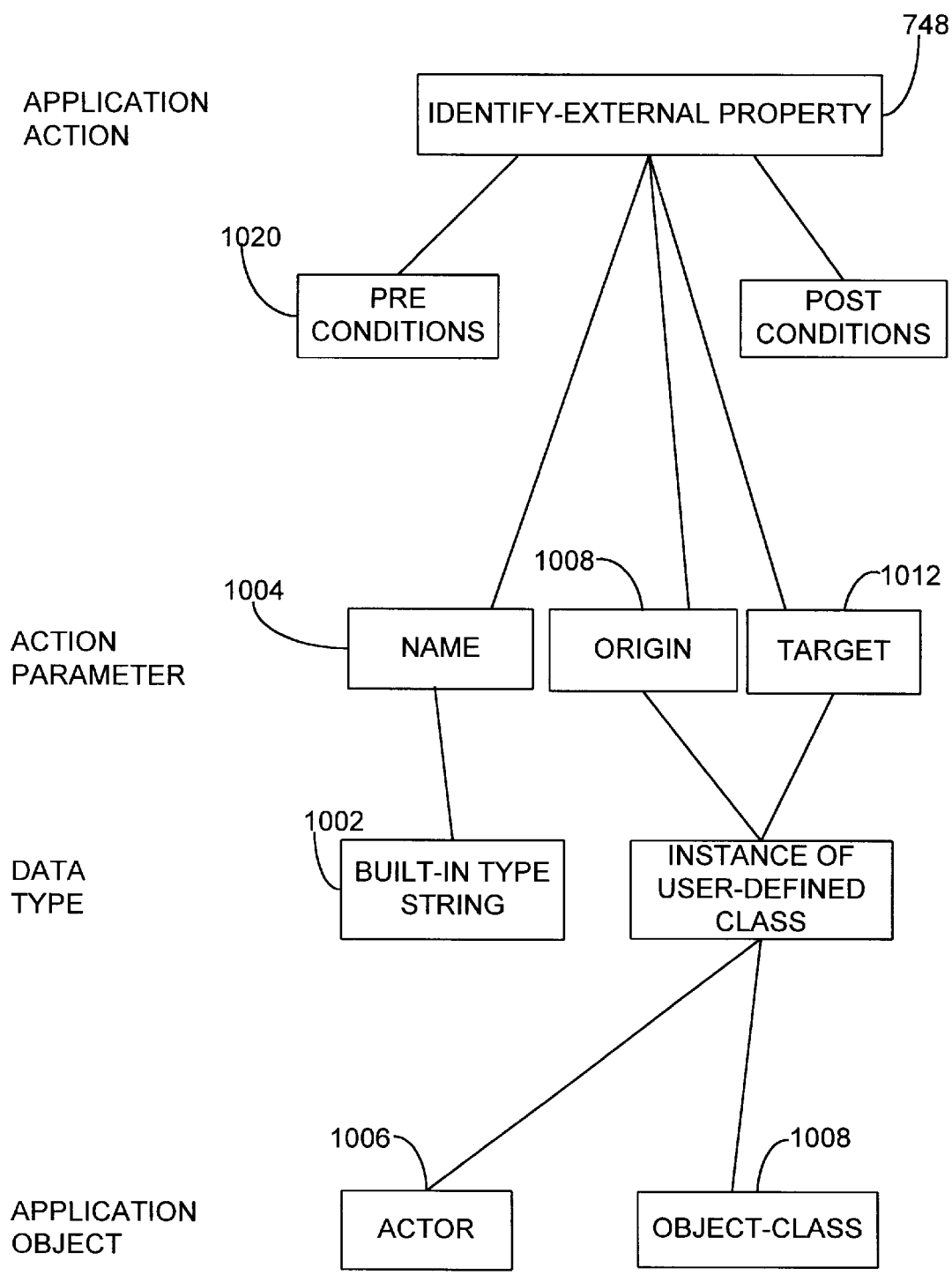
FIG. 10 illustrates the objects generated in the application conceptual model 612 from the action identify-external-property 748 of the specification 604.

FIG. 10 shows a partial instantiation of the application conceptual model 612 corresponding to the specification 604 in FIG. 7. That is, FIG. 10 illustrates the modeling of the action identify-external-property 748, indicating that it has three parameters and what their data types are. For example, the parameter, name 1004, is of built-in type, :string, while the other two parameters (i.e., origin 1008 and target 1012) have as their data type an instance of one of the object classes actor 1006 or object-class 1008. Further note that FIG. 10 does not show any user interface-specific details, such details being resolved or generated when mapping the application conceptual model 612 into user interface 614. Accordingly, the application conceptual model 612 reflects the information requirements of the present invention and does not depend on specific user interface choices (although user interface hints are stored internally for later use during the generate step 616).

The MBUIG client 520 generates a user interface 614 (for display on the browser 516) as a collection of primitives wherein each such primitive is structured based on the semantics of a current tutoring session and on a desired dialogue style. The MBUIG client 520 identifies user interface components, their properties, and structuring principles for assembling graphical components into a coherent user interface 614. The behavior and the look-and-feel of a user interface 614 are explained in terms of properties of user interface components and the way they are structured. The look and feel can be changed by applying transformations which modify the structure and reconfigure primitives in a principled way, as described in Kovacevic, S., *A Compositional Model of Human-Computer Interaction,* DSc dissertation. The George Washington University, 1992b.

The MBUIG client 520 moves the traditional programming boundary between a user interface 614 and the application-specific part (i.e., application conceptual model 612) by identifying a layer of components that maintain and utilize the user interface-related context of an application. That is, the present invention goes beyond the traditional user interface tools and models that focus only on input and output communication tasks in that the MBUIG client 520 identifies both a set of buffering components that store the user interface 614 context and a set of supporting control components that maintain and utilize the contextual information provided in specification 604. Consequently, user interface 614 is no longer only a passive transducer between the user and the applicant's functional core; it also performs three major tasks; communication, buffering, and controlling and maintaining information flow.

Accordingly, moving the user interface boundary increases reusability and flexibility of a user interface 614. Note that this boundary is moved by extracting functions which are not application-specific out of an application and placing them into a user interface 614.

Figure 11:
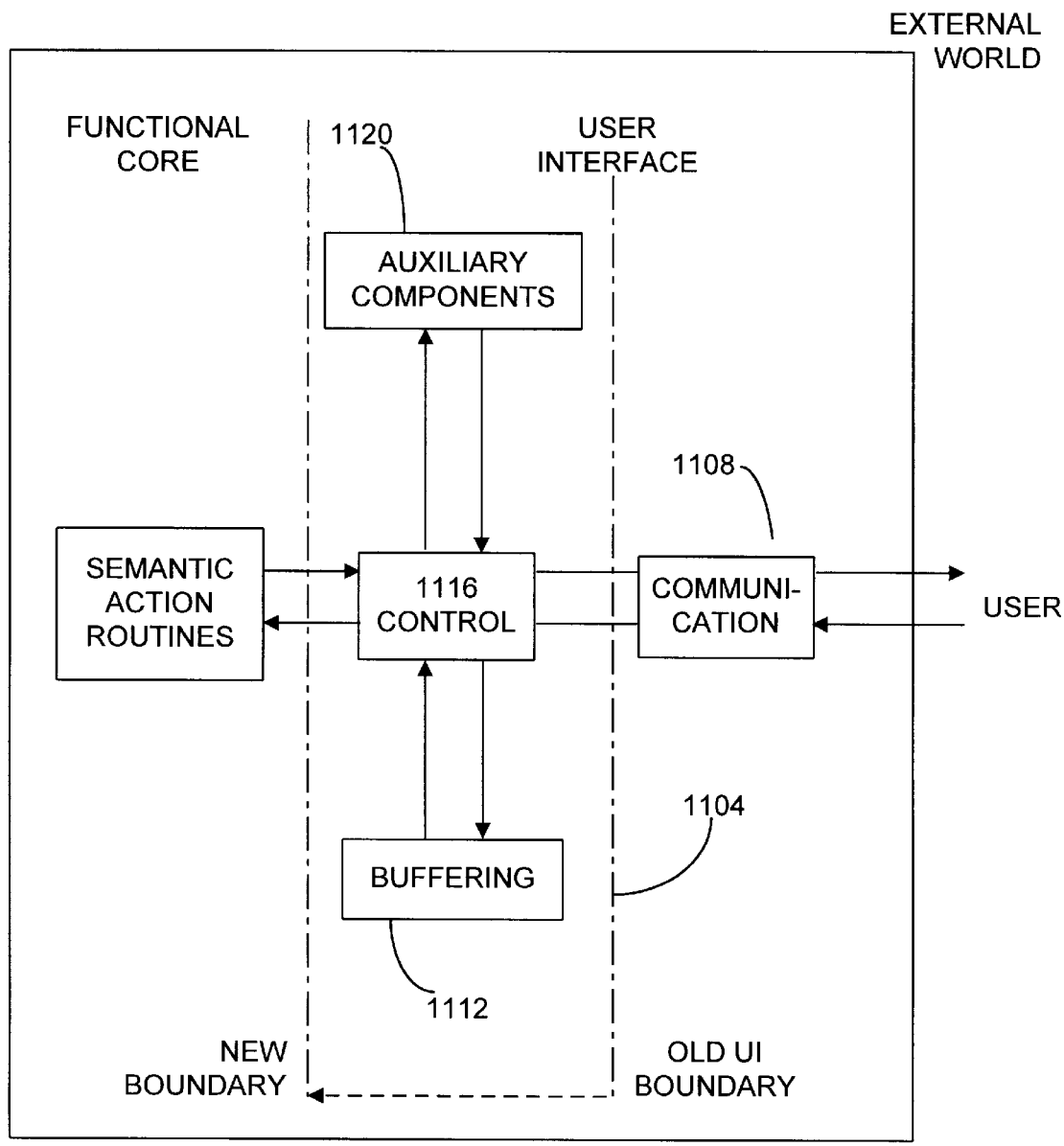
FIG. 11 illustrates the distinction between the user interfaces as provided by the present invention and prior art user interfaces.

FIG. 11 illustrates the distinction between previous user interface boundaries and those of the present invention. The previous user interface boundary 1104 represents a traditional view of user interfaces. The present invention moves this boundary and the user interface 614 now includes a number of functional components performing different user interface tasks. The communication 1108, buffering 1112, and control 1116 components are necessary parts of a user interface 614, because they perform mandatory user interface tasks, but a user interface 614 can also include auxiliary components 1120 performing optional tasks, such as error-recovery and help. It is an aspect of the present invention to include these tasks in the user interface because they do not contribute to the application's functionality but to the quality of its user interface. However, they are optional because a user interface can function without them, though a user will probably perceive such a user interface as of lesser quality.

User Interface Primitives

Figure 12:
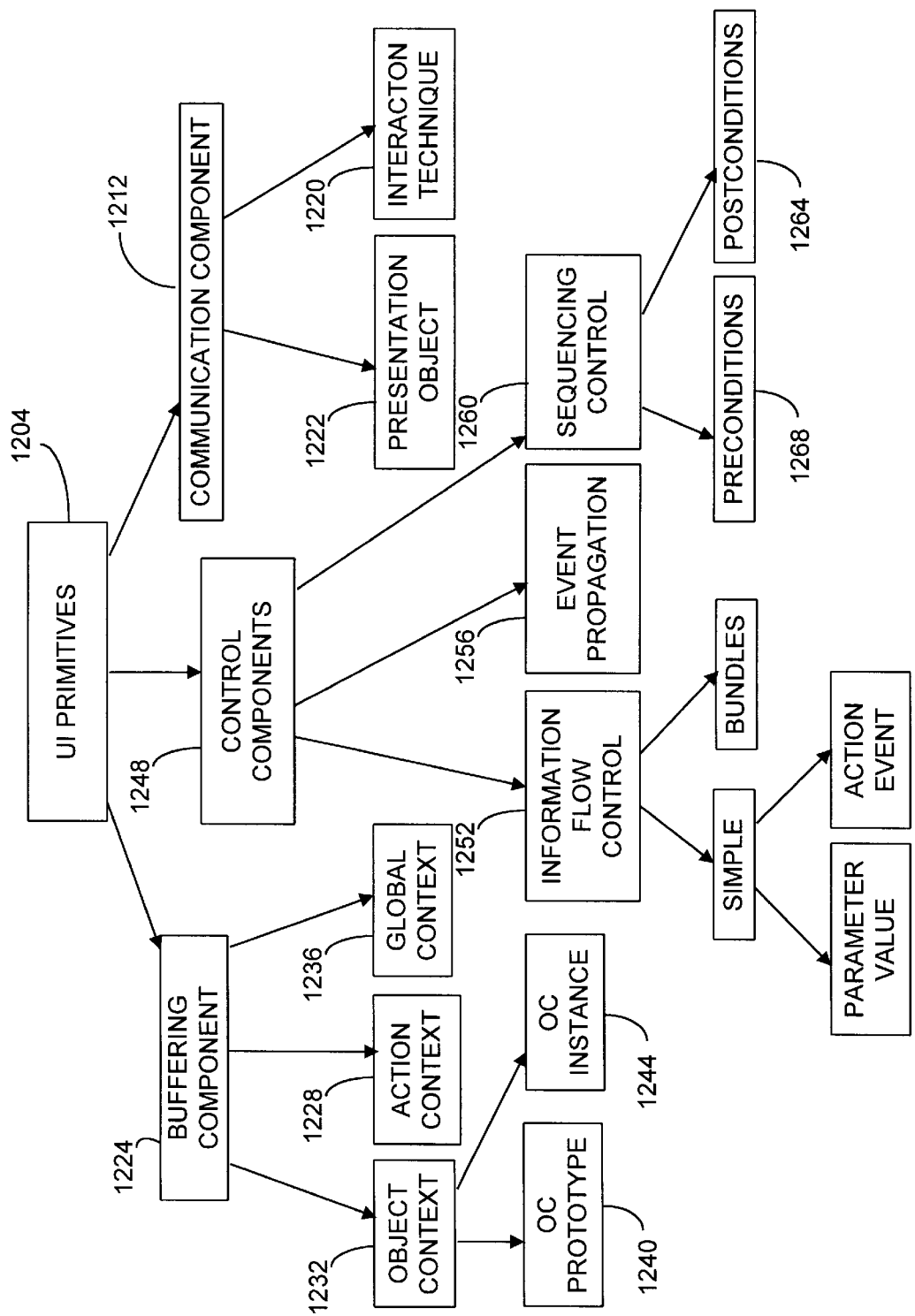
FIG. 12 presents a class hierarchy of user interface primitives utilized by the present invention.

The three components (control 1116, buffering 1112 and communication 1108) perform a variety of tasks and each is supported by a number of user interface primitives, or building blocks. FIG. 12 shows a partial class hierarchy of user interface modeling primitives used by the present invention. Each primitive is defined by a set of properties which control its behavior, methods which deliver that behavior, and messages it can receive from or send to other primitives. Objects from these classes are configured to serve specific roles by setting their properties depending on application semantics and the desired dialogue style. Properties can be modified to change the look and feel of a user interface by applying design transformations as described in: (a) Foley, J.; Kim, W. C.; Kovacevic, S.; and Murray, K., "UIDE—An Intelligent User Interface Design Environment," in *Architectures for Intelligent Interfaces: Elements and Prototypes*, Sullivan J., Tyler S., eds., Addison-Wealey, 1991; (b) Kovacevic, S., *A Compositional Model of Human-Computer Interaction*, DSc dissertation; The George Washington University, 1992b; and (c) Kovacevic, S., *TACTICS for User Interface Design; Coupling the Compositional and Transformation Approach*, Applied Research & Multimedia Services Technical Report AT-09-10-002763-10.00, U S West Advanced Technologies, 1993.

A brief discussion of the classes of FIG. 12 is now provided:

(12.1) Communication components 1212: there are two primitive classes derived from the communications component class 1212 for performing communication tasks: interaction techniques 1220 map external inputs into internal forms, and presentation objects 1222 map a given internal information form into desired presentation properties, such as color, size, shape or tone pitch.

(12.2) Buffering components 1224: different aspects of the overall user interface context are kept in three types of user interface primitives: action-context 1228, object-context 1232 and global-context 1236. During the activation of an action, the action-context 1228 primitive keeps all (known) pieces of information needed to perform the action, decoupling the order in which information is specified from the order in which it is passed to the application functional part. For instance, when a user enters a parameter value, the value is not necessarily passed to the functional core right away, but it may be stored in the user interface 614 until all values are collected. This way, the application's functional part does not depend on the order in which values are entered—it is shielded from a specific syntax which can be changed without having to change the functional core. Between the activations, the action-context instance keeps the information which is reusable across multiple activations of the action and specific to that action, such as default and global parameters values. The object-context-prototype 1240 primitives keep global properties for each application object class, including default and global attribute values. The object-context-instance 1244 primitives keep attribute values for object instances which are part of the user interface context (i.e., are not internal to the functional core). The action and the object related buffering primitives (1228 and 1232, respectively) implicitly describe some aspects of the user interface 614 state; the remaining context information is maintained in the global-context primitives 1236. Objects of this class serve as a public blackboard accessible to all, which is not the case with the action-context 1228 and object-context 1232 primitives. The postings include state information for maintaining the sequencing and information flow control, and properties of sets, e.g., currently selected objects and clipboard objects.

(12.3) Control components 1248. Their role spans three major tasks, with specialized user interface primitives (i.e., classes) for each: information flow control, sequencing control, and event propagation.

Information-flow-control 1252 (IFC) primitives maintain information flow in a user interface 614, integrating functional parts of the user interface into a single structure. These primitives act as intermediaries in obtaining information required by an action. They know where to look for each piece of information—whether to get it from a communication primitive 1212 or from a buffering component 1224, and which one.

The sequencing 1260 control primitives maintain and monitor the relevant user interface context. They update the context whenever something potentially affecting the IFC 1252 primitives happens, and they constantly evaluate the context to enable/disable those primitives. Two tasks are performed by specialized subclass primitives: postconditions for updating the context (by the postconditions class 1264) and preconditions for evaluating the context (by the preconditions class 1268).

The event-propagation primitives 1256 propagate events of interest, performing relation detection and enforcement.

A discussion is now provided as to how these primitives are used by the MBUIG client 520 to build a user interface 614.

User Interface Generation in the MBUIG Client 520

The user interface 614 generation process is driven primarily by the information requirements of application concept model 612, and secondarily by the requirements of a selected look and feel. The secondary requirements are satisfied only if all necessary interaction components are available and compatible with the information requirements.

The user interface 614 generation includes three steps involving two kinds of transformations: vertical and lateral. The vertical transformations map one set of components onto another set of components at a different level of abstraction, while the lateral transformations reorganize components at the same level as described in Balzer, R., "A 15 year perspective on automatic programming," *IEEE Transactions on Software Engineering*, vol. SE-11, pp. 1257–1267, 1985, herein incorporated by reference.

The first step involves vertical transformations that transition from application conceptual model 612 to a user interface 614 that preserves the original application semantics while incorporating additional user interface domain knowledge. As one skilled in the art will appreciate, these transformations (a) map each application modeling primitive of the application conceptual model 612 onto one or more user interface primitives, configured accordingly, and (b) build an initial user interface structure that reflects all the information needs of the original application. Accordingly, the initial user interface structure consists only of buffering and control primitives. For instance, each Application Action 720 primitive is mapped onto one Action Context buffering primitive 1228 and three Action Event primitives (not shown): Select Action (makes the action active), Cancel Action (deactivate the action), and Confirm Action (confirms action parameter values and invokes the semantic action routine in functional core that uses the parameters).

Figure 13A:
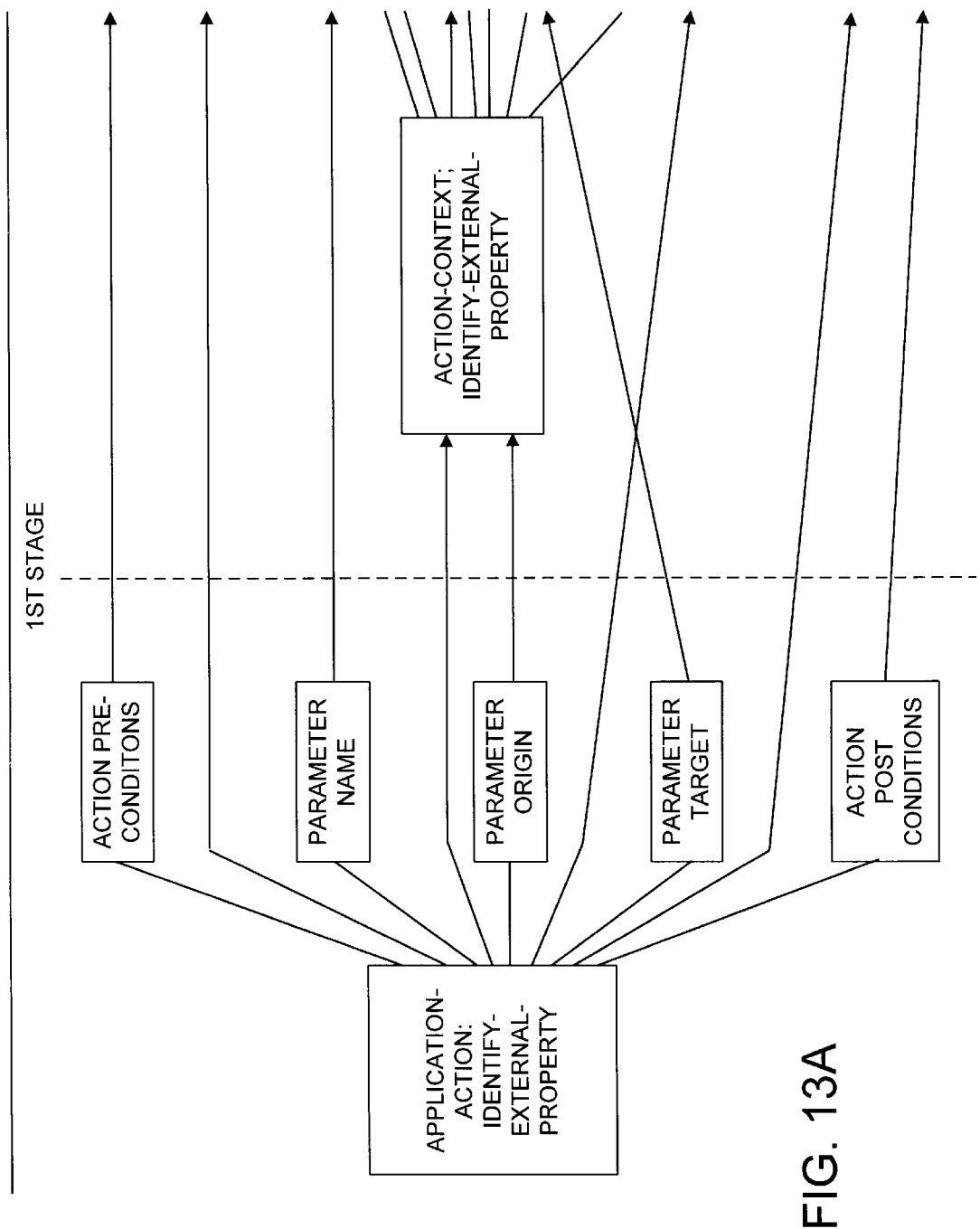
FIGS. 13A and 13B illustrate the user interface generation steps for creating a partial user interface structure for the action identify-external-property 748 from its conceptual model residing in the application conceptual model 612.
Figure 13B:
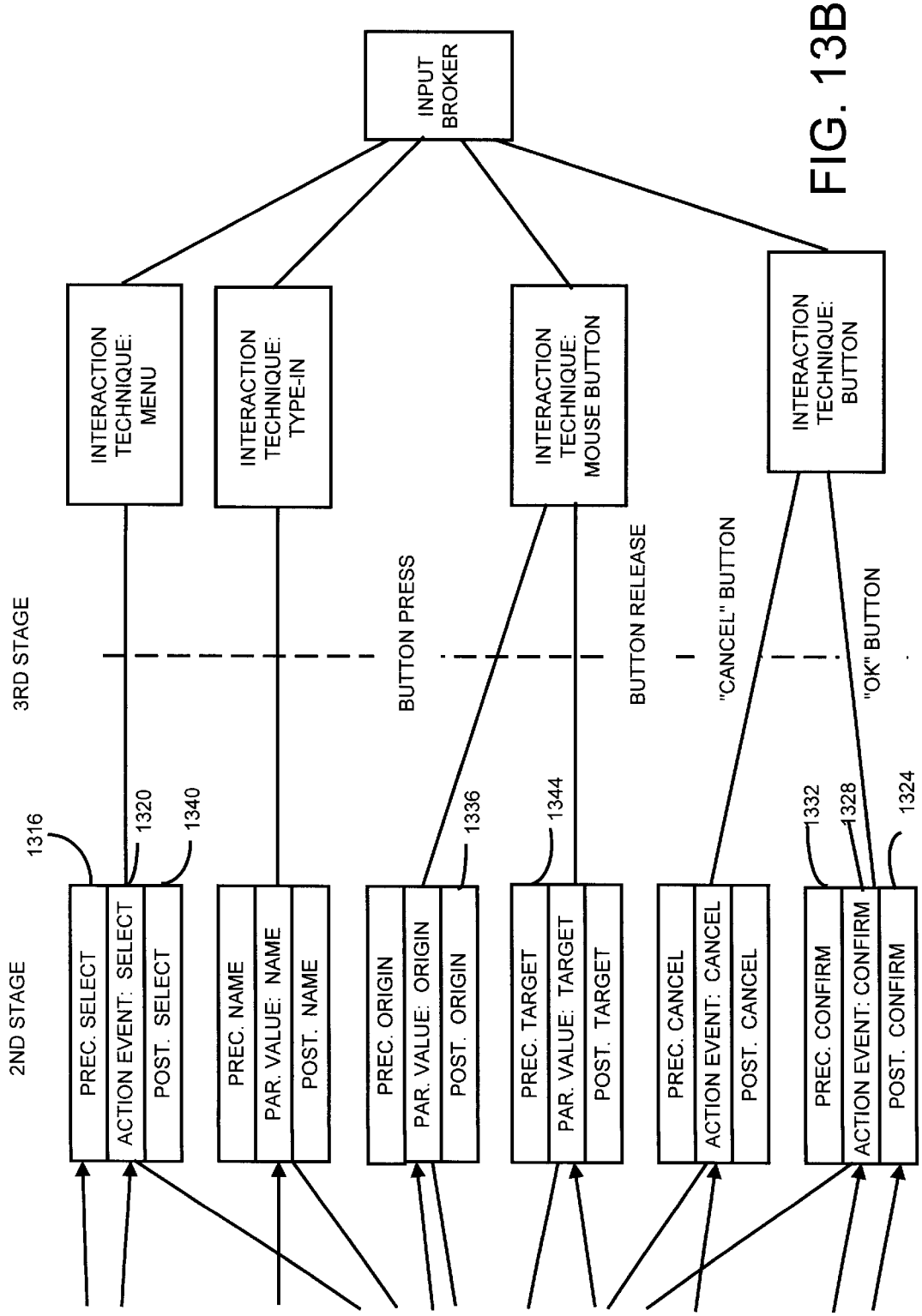

FIG. 13 shows the user interface structure generated for that part of the application conceptual model 612 shown in FIG. 10. The application conceptual model components are shown in heavier lines. The Data Type components from FIG. 10 are not shown here, but this and all other related information that can be inferred from the application conceptual model 612 is used when configuring user interface primitives 1204. Thick arrows link the application conceptual model 612 components of FIG. 10 to the user interface 614 components instantiated and configured in the first generate step 616, by applying vertical transformations. The user interface components are configured to preserve the semantics captured in the application conceptual model 612. For instance, the action's semantic preconditions (i.e., preconditions 1020 of FIG. 10, and specified by "(precondition (exist ((object-class actor) 2))" 780 in FIG. 7, and interpreted as meaning that the action is enabled only if there are at least two instances of classes Actor or Object-Class) are incorporated into preconditions 1316 of the Select Action 1320 component. Similarly, application conceptual model postconditions 1024 of FIG. 10, if any, are mapped into postconditions 1324 of the Confirm Action component 1328. The generation rules also include syntactic constraints on sequencing into the pre- and postconditions generated for Information Flow Control Primitives 1252. For instance, preconditions 1332 of the Confirm Action primitive 1328 will require that the action be selected and that all parameters have their values. In turn, each Parameter Value primitive's postconditions (e.g. postcondition 1336) will assert that the parameter has a value, and Select Action primitive's postcondition 1340 will assert that the action is selected. In the case of prefix syntax, each Parameter Value primitive's preconditions (e.g. precondition 1344) will also require that the action be selected.

The second and third steps of user interface generation involve lateral transformations, which operate within the set of user interface primitives, as one skilled in the art will appreciate.

Note that the second step is optional and involves lateral transformations that modify an initial user interface structure by altering its behavioral characteristics while preserving the information requirements characteristics. The advantages of having separate vertical transformations for producing an initial user interface structure and lateral transformations for modifying it to achieve a desired behavior are twofold. First, the vertical transformations are kept much simpler, without any loss of functionality; i.e., different designs can be produced and still have only a basic set of vertical transformations. Second, the lateral transformations bring the added benefit of providing support for design space exploration and, if they are exported and made accessible in a run-time environment, can enable user interface customization even at run-time, by end-users. For instance, transformations can modify the user interface 614 so that explicit selection of an action is not needed, but the action is automatically activated whenever its preconditions are satisfied. Or, the user interface structure can be modified so that an action is triggered automatically when an object on which it operates is selected, like in direct manipulation interfaces (e.g., move an object simply by selecting it and dragging, instead of having to select the move action first). Similarly, confirmation can be made implicit so that the action is executed as soon as all parameter values are provided. Detailed discussion of these and other design transformations can be found in Foley, J. et al., "User Interface DE—An Intelligent User Interface Design Environment," in *Architectures for Intelligent Interfaces: Elements and Prototypes,* Sullivan J., Tyler S., eds. Addison-Wesley 1991.

Finally, the third stage of transformations in FIG. 13 transforms the user interface structure by integrating communication primitives that will provide necessary inputs and outputs. The communication primitives are selected and configured based on user interface hints as provided in the specification 604. If no explicit hints are given, or the hints given indicate the use of a component that is not available or not compatible with the information requirements, the corresponding user interface details are considered as "specification freedom" as described in Balzer, R., "A 15 year perspective on automatic programming," *IEEE Transactions on Software Engineering,* Vol. SE-11, pp.1257–1267, 1985, and are resolved using special rules that use other available information to provide reasonable defaults.

Figure 14:
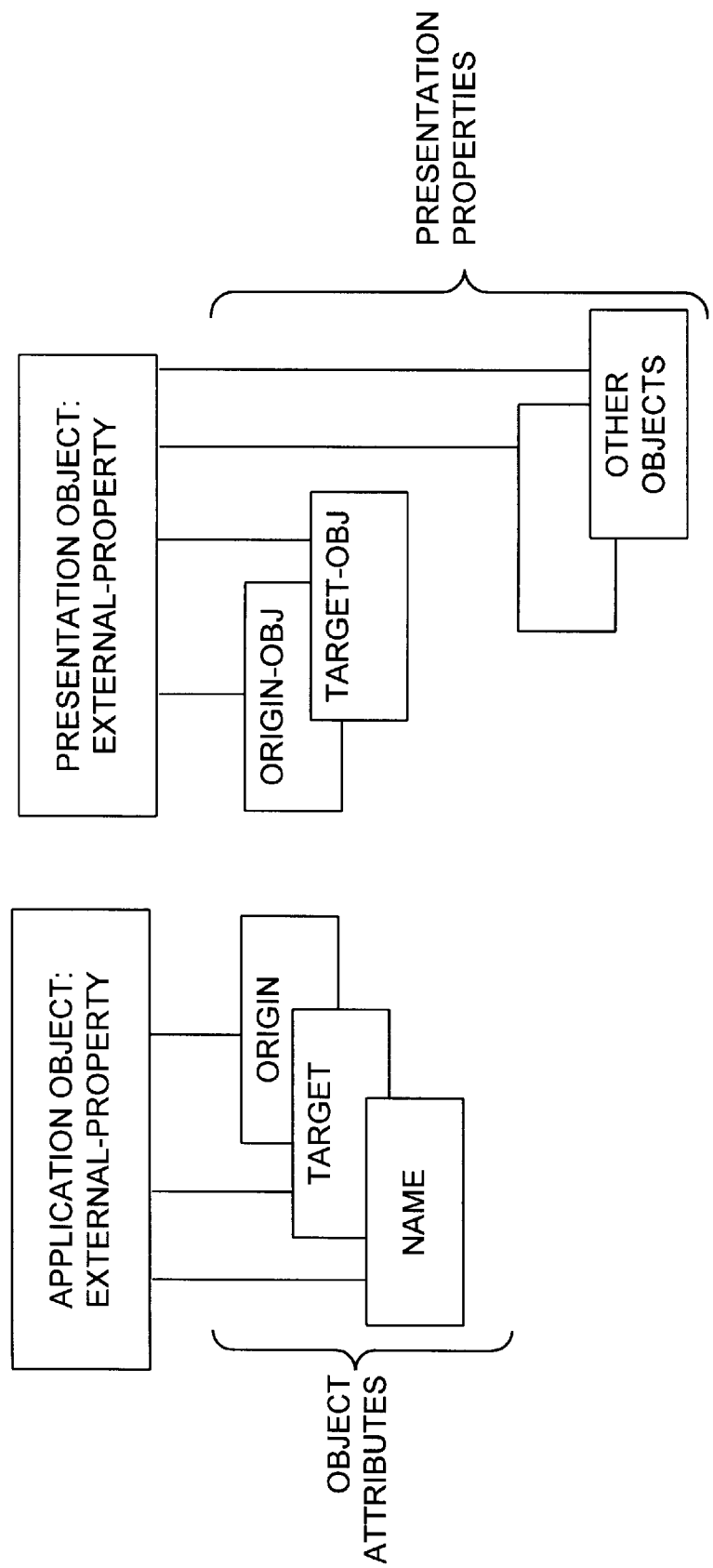
FIG. 14 illustrates the mapping between the application object for the action identity-external-property 748 and the corresponding presentation objects provided in a user interface.

Instantiating user interface structures for application objects is similar in principle to application actions. However, while each action parameter must have an information source (although it does not have to be a user input, but can be a default or a global value), there is no insistence on a comparable requirement applied to object attributes. Not every object must have a (graphical) presentation object, not every attribute must be presented. For instance, an object must have a graphical presentation object only if it is to be graphically manipulated (i.e., using direct manipulation); otherwise, the presentation is optional. On the other hand, each object has an implicit representation for presenting in a list of options; thus, if it needs to be selected as an input for an action, it can be presented in a menu list using some of its attributes. Which one, can be explicitly specified, as shown in FIG. 7. For example, in the action Identify-Actor 740, the ChoiceSelection 732 interaction technique is configured to display a list of noun phrases using values of attribute name 744. FIG. 14 illustrates the mapping for the external-property object 748.

FIG. 14 does not show it, but an object can have multiple presentations. Also, an object attribute can have multiple presentations, in the same way action parameters can have multiple input sources (e.g., in different modalities).

Accordingly, the present invention supports user interface features not supported by an HTML browser 516 that is not in communication with an MBUIG client 520. The user interface illustrated in FIG. 8 is a dynamic, graphical user interface supporting direct manipulation. Objects can be manipulated and parameter values provided using graphical interactions, e.g., actor objects can be resized and dragged. The user interface provides feedback, including updates to the presentations of any external-property linked to the actor being manipulated, without having to exchange messages over the network (e.g., World Wide Web). An HTML browser 516 cannot alone provide such dynamic feedback. Instead, for an HTML browser not having access to an MBUIG client 520, in order to process user feedback it has to contact either (a) a helper application (having application domain knowledge) on the client node 508, or (b) a network server having an application that can process the user feedback. That is, for user interactions related to manipulations of an application user interface displayed via the HTML browser 516, it is likely that (some portion of) the application must be loaded onto the client 508, or a network server contacted frequently.

Furthermore, the present invention supports a full-fledged application that can maintain its context, send the relevant portions of it to the coach (i.e., SLOOP server 512) for evaluation, or reinitialization when needed. An HTML browser 516 alone would need a sophisticated helper application, and a session manager to deliver such functionality. For the object-oriented tutoring application of the present invention, a specialized session manager would be needed for each practice activity maintaining a different context, or the session manager would need the capability to be dynamically reconfigured, configuring its behavior based on a high-level specification.

This lack of a capability to provide dynamic feedback and to maintain the relevant context are reasons why HTML browsers 516 alone are not enough even for otherwise relatively simple user interfaces. While HTML browsers 516 alone support basic interactions involved in, for example, selecting text strings or items from a list, they cannot maintain and control the local context without excessive network overhead. That is, to provide dynamic feedback an HTML browser 516 would need to fetch a new page for each change, resulting in excessive overhead and delay.

Said another way, the present invention provides a direct manipulation graphical user interface using an HTML browser wherein a client 508 user is provided with the ability to interact with a tutorial application relating to a specific subject matter (e.g., banking transactions) so that the user can create, delete or modify graphical objects whose data structure definitions were provided by the server node, each such object having, for example, a behavior or data structure representing the semantics of a tutorial subject matter entity, wherein such user changes, independently of any communication with the SLOOP server 512, are accumulated and utilized on the client 508 to maintain an interactive user interface semantically consistent both with the tutorial application and with the user's interactions. This is accomplished without activating any client resident process having programmatic instructions embodying the semantics of the tutorial subject matter through the utilization of subject matter independent of MBUI client 520. That is, the maintenance and control of a subject matter specific user interface, based on a direct manipulation paradigm, is accomplished by a combination of local control with periodic activation of the HTML browser 516 to communicate with the server node for performing processing that is application specific. Accordingly, for the application processing on the client node it is unnecessary to have a subject matter specific helper application residing on the client 508. Thus, new or modified tutorial applications can be provided to the client 508 user without modifying the software or hardware configuration of the client 508.

Another potential problem with using HTML browser 516 alone for, in particular, delivering training is insufficient control over what functionality is available. The HTML browser 516 cannot easily be customized to selectively disable some functionality or add non-standard capabilities. Accordingly, such capabilities would also have to be handled through either helper applications and a session manager residing on the client 508 or via frequent communication with a network server. In the present invention, however, such capabilities are available via a single high-level specification 604.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The preferred embodiment described herein above is further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the prior art.

What is claimed is:

1. A method for performing a software tutoring application distributed between an Internet client node and an Internet server node comprising:

providing, on an Internet client node, a model-based user interface generating module for generating direct manipulation graphical user interfaces displayable at said Internet client node;

sending a first specification corresponding with a software tutoring application from an Internet server node to said model-based user interface generating module on said Internet client node, wherein said first specification is received at said Internet client node using an Internet browser, and wherein said first specification includes a collection of entity representations of said software tutoring application, each said entity representation having an associated predetermined entity definition for defining a structure and semantics corresponding with said entity representation;

transforming said collection of entity representations of said first specification, at said Internet client node, into a corresponding set of tutoring application programming entity data types having direct manipulation graphical representations, wherein:

(A1) for at least some of said tutoring application subject matter programming entity data types, said user interface generating module on said Internet client node determines a display characteristic not provided in said first specification; and (A2) for at least a portion of said entity representations of said collection, prior to receipt of said first specification at said model-based user interface generating module on the Internet client node, said associated predetermined entity definitions are undefined for said user interface generating module, and wherein at least some of said associated predetermined entity definitions for said portion of the entity representations are utilized-in the transformation step;

displaying on said Internet client node a first user interface generated by said user interface generating module using said first specification;

activating said user interface generating module for responding to each of a plurality of user inputs to said first user interface on said Internet client node, each said input resulting in one of: creating and deleting instantiations of said tutoring application subject matter programming entity data types, wherein each response to each of the user inputs is independent of communication with said Internet server node; and receiving at the Internet server node selected information entered or created at the Internet client node by a user, performing an analysis of the selected information, automatically generating performance information relating to the user, and transmitting the performance information from the Internet server node to the Internet client node and said user interface generating module.

2. A method as claimed in claim 1, wherein each said entity representation includes a key word/value pair.

3. A method as claimed in claim 1, wherein for at least some of said key word/value pairs said value component includes a data type definition.

4. A method as claimed in claim 1, wherein said Internet browser is an HTML browser.

5. A method as claimed in claim 1, wherein said server node is a World Wide Web website.

6. A method as claimed in claim 1, wherein assistance information is provided to a user in performing activities related to the software application.

7. A method as claimed in claim 6, wherein subject matter includes object-oriented software design.

8. A method as claimed in claim 6, wherein said server node provides assistance information to said Internet client node in response to the selected information.

9. A method as claimed in claim 8 wherein the assistance information includes providing tutoring information related to learning a subject matter.

10. A method as claimed in claim 8 wherein the assistance information includes information related to activity history.

11. A method as claimed in claim 8 wherein the assistance information includes information relating to proficiency of a user in learning a subject matter.

12. A method as claimed in claim 1, wherein said step of sending includes communicating said specification using a hypertext transfer protocol.

13. A method as claimed in claim 1, wherein said step of transforming includes creating an application model that is a non-graphical representation of said specification, said application model describing a behavior of said first user interface, and said application model being used for instantiating graphical representations of application subject matter programming entity data types in said first user interface.

14. A networked information management system comprising:

model-based user interface generation module residing on a client node of a network, said model-based user interface generation module for generating direct manipulation graphical user interfaces displayable at said client node;

specification generation system residing on a server node of said network, said specification generation system for generating a specification corresponding with a software tutoring application, said specification including a collection of entity representations of said software tutoring application, each said entity representation having an associated predetermined entity definition for defining a structure and semantics corresponding with said entity representation;

transmitter network for transmitting said specification from said server node to said model-based user interface generation module on the client node;

transforming module residing on said client node, said transforming module for transforming said collection of entity representations into a corresponding set of programming entity data types having direct manipulation graphical representations, wherein:

(A1) for at least some of said programming entity data types, said user interface generating module on said client node determines a display characteristic not provided in said specification; and (A2) for at least a portion of said entity representations of said collection, prior to receipt of said specification at said model-based user interface generation module on the client node, said associated predetermined entity definitions are unspecified for said user interface generating module, and wherein at least some of said associated predetermined entity definitions for said portion of the entity representations are utilized in the transformation step;

display device on said client node for displaying a user interface generated by said user interface generating module using an output of said transforming module on said client node;

a subject matter coach module which resides on the server node, which in response to receipt of selected information entered or created by a user at the client node, performs an analysis of the selected information and generates performance information relating to the user, where the performance information is then transmitted to the client node; and wherein said user interface is responsive to each of a plurality of user inputs to said user interface on said client node, each said user input resulting in one of: creating and deleting instantiations of said programming entity data types, and wherein each response to each of the user inputs is independent of communication with said server node.

15. An apparatus as claimed in claim 14, wherein said network uses an Internet protocol.

16. An apparatus as claimed in claim 14, wherein said server node is a World Wide Web server node.

17. An apparatus as claimed in claim 14, wherein said entity representations include key word/value pairs.

18. An apparatus as claimed in claim 14, said subject matter coach module provides tutoring information to the client node.

19. An apparatus as claimed in claim 14, said subject matter coach module provides evaluation information to the client node.

20. An apparatus as claimed in claim 14, said subject matter coach module provides historical information to the client node.

21. An apparatus as claimed in claim 14, further including an HTML Internet browser for receiving said collection at said client node.

22. An apparatus as claimed in claim 14, wherein said user interface is included in an automated tutorial application.

23. An apparatus as claimed in claim 22, wherein said automated tutorial application tutors in object-oriented software design.

24. An apparatus as claimed in claim 14, wherein said specification generation system includes an automated coaching system for responding to a request for assistance from a user at said client node.

25. An apparatus as claimed in claim 14, wherein said transforming module includes creating a data structural model that is a non-graphical representation of said specification, said model having information describing a behavior of said user interface, and said model being used for instantiating graphical representations of said programming entity data types for said user interface.

* * * * *